(12) United States Patent
Yoshizumi

(10) Patent No.: US 9,596,415 B2
(45) Date of Patent: Mar. 14, 2017

(54) CONTROL APPARATUS, IMAGING SYSTEM, CONTROL METHOD, AND PROGRAM FOR CHANGING A COMPOSITION OF AN IMAGE

(75) Inventor: Shingo Yoshizumi, Tokyo (JP)

(73) Assignee: SONY CORPORATION, Tokyo (JP)

(*) Notice: Subject to any disclaimer, the term of this patent is extended or adjusted under 35 U.S.C. 154(b) by 729 days.

(21) Appl. No.: 13/384,686

(22) PCT Filed: Jul. 22, 2010

(86) PCT No.: PCT/JP2010/062300
§ 371 (c)(1),
(2), (4) Date: Jan. 18, 2012

(87) PCT Pub. No.: WO2011/013563
PCT Pub. Date: Feb. 3, 2011

(65) Prior Publication Data
US 2012/0120249 A1    May 17, 2012

(30) Foreign Application Priority Data

Jul. 29, 2009  (JP) .................................. 2009-176626

(51) Int. Cl.
H04N 5/232  (2006.01)
G03B 37/02  (2006.01)
H04N 101/00  (2006.01)

(52) U.S. Cl.
CPC ......... *H04N 5/23296* (2013.01); *G03B 37/02* (2013.01); *H04N 5/232* (2013.01);
(Continued)

(58) Field of Classification Search
CPC ..................... H04N 5/225; H04N 5/23296
(Continued)

(56) References Cited

U.S. PATENT DOCUMENTS 4,912,566 A * 3/1990 Tasaka .................. H04N 1/393
358/302
6,836,344 B2 * 12/2004 Koide .................. H04N 1/4015
358/1.4
(Continued)

FOREIGN PATENT DOCUMENTS

JP    2001-189889  *  7/2001
JP    2001 189889      7/2001
(Continued)

OTHER PUBLICATIONS

Office Action issued Apr. 9, 2013, in Japanese Patent Application No. 2009-176626.
(Continued)

*Primary Examiner* — Jay Patel
*Assistant Examiner* — Irfan Habib
(74) *Attorney, Agent, or Firm* — Chip Law Group

(57) ABSTRACT

A control apparatus, an imaging system, a control method, and a program in which, when performing automatic image-recording, subjects which seem to be present around an imaging apparatus can be recorded as evenly as possible. An automatic recording operation for recording, upon detection of a subject from an image obtained by imaging, data representing an image containing the subject is performed. On that basis, if it is determined, on the basis of image-recording history information, that the transition to a subject configuration different from that used in the last image-recording is to be performed, a movable mechanism unit is moved to change an imaging field-of-view range, thereby obtaining a different subject configuration.

15 Claims, 23 Drawing Sheets

(52) U.S. Cl.
CPC ..... *H04N 5/23219* (2013.01); *H04N 5/23222* (2013.01); *H04N 2101/00* (2013.01)

(58) Field of Classification Search
USPC ....................................................... 348/169
See application file for complete search history.

(56) References Cited

U.S. PATENT DOCUMENTS

| | | | | |
|---|---|---|---|---|
| 7,251,346 B2* | 7/2007 | Higaki | ................... | G01C 11/00 382/103 |
| 7,362,895 B2* | 4/2008 | Masumura | ............. | H04N 5/217 348/E5.078 |
| 7,551,800 B2* | 6/2009 | Corcoran | ................ | G06K 9/40 382/254 |
| 7,729,512 B2* | 6/2010 | Nishiyama | ............... | G06K 9/32 382/100 |
| 7,756,299 B2* | 7/2010 | Higaki | ............... | G06K 9/00201 348/154 |
| 8,164,809 B2* | 4/2012 | Ohkawa | ............... | H04N 1/4095 358/1.9 |
| 8,294,768 B2* | 10/2012 | Lee | ....................... | G01S 3/7864 348/143 |
| 8,755,632 B2* | 6/2014 | Rozenberg | ............ | G06T 3/4038 345/634 |
| 8,831,285 B2* | 9/2014 | Kang | ................... | G06K 9/2018 348/661 |
| 9,363,487 B2* | 6/2016 | Chosak | ............ | G08B 13/19608 |
| 2004/0207743 A1* | 10/2004 | Nozaki | ............. | H04N 5/23212 348/333.12 |
| 2004/0233282 A1* | 11/2004 | Stavely | ............ | G08B 13/19602 348/143 |
| 2006/0103741 A1* | 5/2006 | Ogawa | ................... | H04N 5/772 348/231.99 |
| 2006/0210264 A1* | 9/2006 | Saga | ....................... | G03B 13/30 396/287 |
| 2008/0024621 A1* | 1/2008 | Sugimoto | .......... | G06K 9/00261 348/222.1 |
| 2008/0166052 A1* | 7/2008 | Hatano | ............. | G06K 9/00221 382/190 |
| 2008/0239104 A1* | 10/2008 | Koh | ................... | G06K 9/00221 348/240.99 |
| 2009/0096871 A1* | 4/2009 | Kuwano | ............ | G06K 9/00228 348/169 |
| 2009/0102942 A1 | 4/2009 | Yoshizumi et al. | | |
| 2009/0103778 A1* | 4/2009 | Yoshizumi | ......... | G06K 9/00221 382/103 |
| 2009/0256925 A1* | 10/2009 | Yoshizumi | ......... | G06K 9/00221 348/222.1 |
| 2009/0268943 A1* | 10/2009 | Yoshizumi | ............ | G06T 7/0042 382/103 |
| 2009/0322896 A1* | 12/2009 | Yoshizumi | ........... | H04N 1/2112 348/222.1 |
| 2010/0073497 A1* | 3/2010 | Katsumata | ......... | G06K 9/00315 348/211.99 |
| 2010/0157075 A1 | 6/2010 | Yoshizumi | | |
| 2010/0328467 A1 | 12/2010 | Yoshizumi | | |
| 2010/0328524 A1 | 12/2010 | Yoshizumi | | |
| 2011/0019012 A1 | 1/2011 | Yoshizumi | | |
| 2011/0019021 A1 | 1/2011 | Yoshizumi | | |
| 2011/0025854 A1 | 2/2011 | Yoshizumi | | |
| 2011/0157394 A1 | 6/2011 | Yoshizumi | | |
| 2011/0157397 A1 | 6/2011 | Yoshizumi | | |
| 2011/0181687 A1 | 7/2011 | Yoshizumi | | |
| 2011/0181690 A1 | 7/2011 | Yoshizumi | | |
| 2011/0216159 A1 | 9/2011 | Yoshizumi | | |
| 2011/0216225 A1 | 9/2011 | Yoshizumi | | |
| 2012/0002075 A1 | 1/2012 | Yoshizumi et al. | | |

FOREIGN PATENT DOCUMENTS

| | | |
|---|---|---|
| JP | 2002 51304 | 2/2002 |
| JP | 2009 100301 | 5/2009 |
| JP | 2009 129389 | 6/2009 |

OTHER PUBLICATIONS

U.S. Appl. No. 13/383,450, filed Jan. 11, 2012, Yoshizumi.
U.S. Appl. No. 13/383,589, filed Jan. 12, 2012, Hayakawa, et al.
U.S. Appl. No. 13/384,898, filed Jan. 19, 2012, Yoshizumi.
U.S. Appl. No. 14/062,599, filed Oct. 24, 2013, Yoshizumi.
International Search Report Issued Aug. 31, 2010 in PCT/JP10/62300 Filed Jul. 22, 2010.

* cited by examiner

CONTROL APPARATUS, IMAGING SYSTEM, CONTROL METHOD, AND PROGRAM FOR CHANGING A COMPOSITION OF AN IMAGE

TECHNICAL FIELD

The present invention relates to a control apparatus, an imaging system, and a method in which a subject, for example, is searched for, and image-recording is automatically performed. The present invention also relates to a program for causing the control apparatus to execute necessary steps.

BACKGROUND ART

For example, in PTL 1, a technique for detecting a smiling face in an image of image data is disclosed, and an example in which the detection of a smiling face is applied to an imaging apparatus, such as a digital still camera, is also disclosed.

That is, by using a digital still camera, the following series of still-image capturing operation is performed. In a captured image obtained by capturing an image of a subject, a smiling face of the subject is detected. If a smiling face is detected, a shutter is released, and a frame image which has been input at the very moment when the shutter has been released is extracted as a still image, and data representing that still image is stored in a memory. Accordingly, the digital still camera automatically performs a still-image capturing operation without an instruction from a user so that it can capture an image of a smiling face of the subject.

CITATION LIST

Patent Literature

PTL 1: Japanese Unexamined Patent Application Publication No. 2009-129389

SUMMARY OF INVENTION

Technical Problem

However, if a digital still camera applied to the above-described smiling-face detection is merely placed at a fixed point, the images of smiling faces of only a specific subject contained in the imaging field-of-view range are recorded. That is, the images of only the same subject with a similar facial expression are recorded. Photos obtained as a result of image-recording in this manner do not seem to be interesting.

For example, assuming a situation where a considerable number of persons that can be subjects are present around a digital still camera that can perform automatic image-recording, it is demanded that the persons around the digital still camera be image-recorded as evenly as possible. In order to do so, it is demanded, for example, that the plural persons around the imaging apparatus be selected as subjects to be image-recorded as evenly as possible without concentrating on specific persons.

Solution to Problem

Accordingly, in view of the above-described problem, a control apparatus of the present invention is configured as follows.

That is, the control apparatus includes: subject detection means for inputting therein image data which is obtained by performing imaging by using an imaging unit and for detecting a subject present in an image based on the image data; image-recording control means for performing control so that image-recording for recording the image data which represents the image containing the subject detected by the subject detection means on a recording medium is executed; transition determining means for determining on the basis of a history of the image-recording whether to perform a transition to a state in which another subject configuration is to be detected by the subject detection means; and imaging field-of-view range changing control means for controlling, in accordance with the fact that a determination result that the transition is to be performed has been obtained by the transition determining means, driving of a movable mechanism unit that changes an imaging field-of-view range of the imaging unit so that a subject forming a subject configuration which is at least different from a subject configuration used in last image-recording is to be detected by the subject detection means.

Additionally, an imaging system is configured as follows. The imaging system includes: a control apparatus; and a movable mechanism apparatus including a mechanism that is movable so as to change an imaging field-of-view range of the control apparatus. The control apparatus or the movable mechanism apparatus includes subject detection means for inputting therein image data which is obtained by performing imaging by using the control apparatus and for detecting a subject present in an image based on the image data, image-recording control means for performing control so that image-recording for recording the image data which represents the image containing the subject detected by the subject detection means on a recording medium of the control apparatus is executed, transition determining means for determining on the basis of a history of the image-recording whether to perform a transition to a state in which another subject configuration is to be detected by the subject detection means, and imaging field-of-view range changing control means for controlling, in accordance with the fact that a determination result that the transition is to be performed has been obtained by the transition determining means, driving of the movable mechanism apparatus so that a subject forming a subject configuration which is at least different from a subject configuration used in last image-recording is to be detected by the subject detection means.

With the above-described configurations, the imaging field-of-view range of the imaging unit is changeable by the movable mechanism unit. Additionally, upon detection of a subject from an image obtained by imaging, data representing an image containing this subject is recorded.

On that basis, if it is determined, on the basis of image-recording history information, that the transition to a subject configuration different from that used in the last image-recording is to be performed, the movable mechanism unit is moved to change the imaging field-of-view range, thereby obtaining a different subject configuration.

Further, an image processing apparatus is configured as follows. The image processing apparatus includes: subject detection means for inputting therein image data which is obtained by performing imaging by using an imaging unit and for detecting a subject present in an image based on the image data; recording control means for performing control so that image-recording for recording the image data in which the subject detected by the subject detection means is contained in a frame on a recording medium is executed; transition determining means for determining on the basis of a history of the recording operation whether to perform a transition to a state in which another subject configuration is to be detected by the subject detection means; and frame changing means for changing, in accordance with the fact that a determination result that the transition is to be performed has been obtained by the transition determining means, the frame so that a subject forming a subject configuration which is at least different from a subject configuration used in last image-recording is to be detected by the subject detection means.

Advantageous Effects of Invention

In this manner, according to the invention of the present application, images of subjects which seem to be around an imaging apparatus can be recorded as evenly as possible while preventing images only with a specific subject configuration from being recorded.

DESCRIPTION OF EMBODIMENTS

Figure 1:
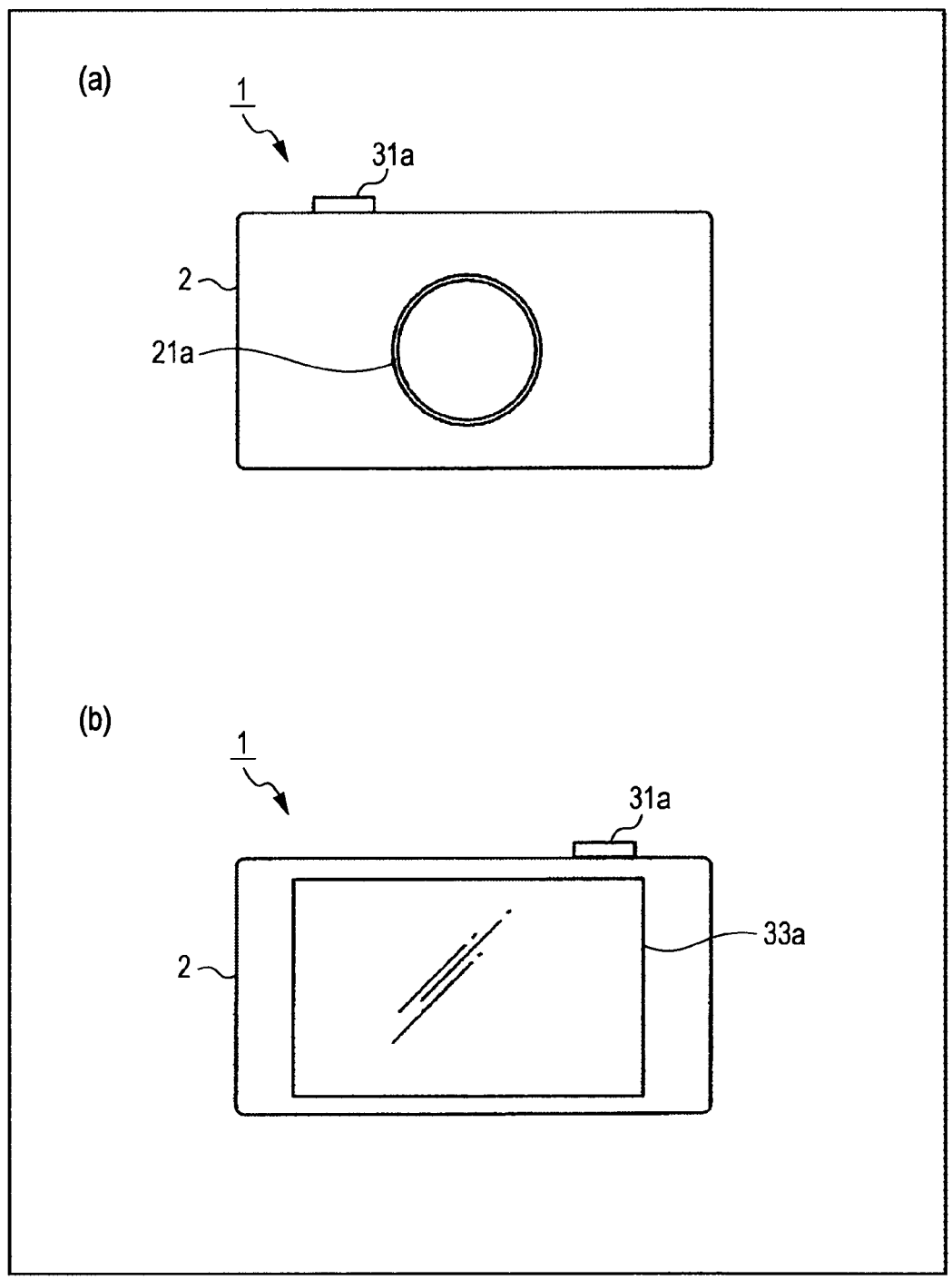
FIG. 1, which includes a front view and a rear view, briefly illustrates outer appearances of a digital still camera, which is an imaging apparatus forming an imaging system of an embodiment.

Hereinafter, modes for carrying out the invention of the present application (hereinafter referred to as "embodiments") will be described in the following order.
<1. Configuration of Imaging System>
  [1-1. Overall Configuration]
  [1-2. Digital Still Camera]
  [1-3. Pan/Tilt Head]
<2. Examples of Functional Configurations Corresponding to Composition Control of Embodiment>
<3. Example of Algorithm that Can be Considered as Automatic Image-Recording Function>
<4. Basic Example of Automatic Image-Recording Algorithm According to Embodiment (First Embodiment)>
<5. Example of Imaging Field-of-View Range Changing Control Algorithm (Second Embodiment)>
<6. Example of Imaging Field-of-View Range Changing Control Algorithm (Third Embodiment)>
<7. Example of Automatic Image-Recording Algorithm According to Transition Conditions (Fourth Embodiment)>
<8. Example of Automatic Image-Recording Algorithm According to Transition Conditions (Fifth Embodiment)>
<9. Example of Automatic Image-Recording Algorithm According to Transition Conditions (Sixth Embodiment)>
<10. Example of Changing of Prescribed Maximum Value According to Imaging Frequency (Seventh Embodiment)>
<11. Example of Changing of Prescribed Maximum Value According to the Number of Subjects (Eighth Embodiment)>
<12. Modified Examples>
  [First Modified Example]
  [Second Modified Example]
<13. Modified Examples of Imaging System of Present Embodiment>

Also, in the present specification, in the following description, the following terms, such as frame, angle of view, imaging field-of-view range, and composition, will be used.

The frame is an area range corresponding to one screen which can fit an image therein, and generally has an outer frame configuration, such as a vertically oriented rectangle or a horizontally oriented rectangle.

The angle of view, which is also called a zoom angle, expresses, in the form of an angle, a range of a frame which is determined by the position of a zoom lens in an optical system of an imaging apparatus. Generally, the angle of view is determined by the focal length of an imaging optical system and the size of an image plane (image sensor or film). Here, an element which is changeable in accordance with the focal length is called an angle of view.

The imaging field-of-view range concerns the range of a frame of an image captured by an imaging apparatus placed at a fixed position, the range being determined by, in addition to the above-described angle of view, an angle in a pan (horizontal) direction and angles (elevation angle and depression angle) in a tilt (vertical) direction.

The composition, which is here also called framing, is a positioning state including, for example, the setting of the size of a subject in a frame which is determined by the imaging field-of-view range.

Also, in the present embodiment, the configuration based on the invention of the present application is applied to, by way of example, an imaging system including a digital still camera and a pan/tilt head to which this digital still camera is attached.

1. Configuration of Imaging System

[1-1. Overall Configuration]

An imaging system of the present embodiment includes a digital still camera 1 and a pan/tilt head 10 on which this digital still camera 1 is placed.

An example of the outer appearance of the digital still camera 1 is first shown in FIG. 1. Part (a) and part (b) of FIG. 1 are a front view and a rear view, respectively, illustrating the digital still camera 1.

The digital still camera 1 shown in those views includes, as shown in part (a) of FIG. 1, a lens unit 21a at the front side of a main body unit 2. This lens unit 21a is a part exposed to the outside of the main body unit 2, as part of an imaging optical system.

Also, a release button 31a is provided at the top portion of the main body unit 2. In an imaging mode, an image (captured image) captured by the use of the lens unit 21a is generated as an image signal. Then, if an operation is performed on the release button 31a during the imaging mode, a captured image obtained when such an operation has been performed is recorded on a storage medium as image data representing a still image. That is, a photographic operation is performed.

The digital still camera 1 also includes, as shown in part (b) of FIG. 1, a display screen unit 33a at the rear side of the digital still camera 1.

On this display screen unit 33a, in the imaging mode, an image which is being captured by the lens unit 21a during the imaging mode, which is called a through image, is displayed. In the playback mode, image data recorded on the storage medium is displayed. Further, an operation image is displayed as a GUI (Graphical User Interface) in accordance with an operation performed on the digital still camera 1 by a user.

It is noted that the digital still camera 1 of the present embodiment is provided with a touch panel on the display screen unit 33a. With this provision, the user is able to perform a certain operation by touching the display screen unit 33a with his/her finger.

Also, the imaging system (imaging apparatus) of the present embodiment includes an imaging unit, which serves as the digital still camera 1, and a movable mechanism unit (movable apparatus, which serves as a pan/tilt head 10, which will be described next. However, the user is able to perform a photographic operation by only using the digital still camera 1, as in a general digital still camera.

Figure 2:
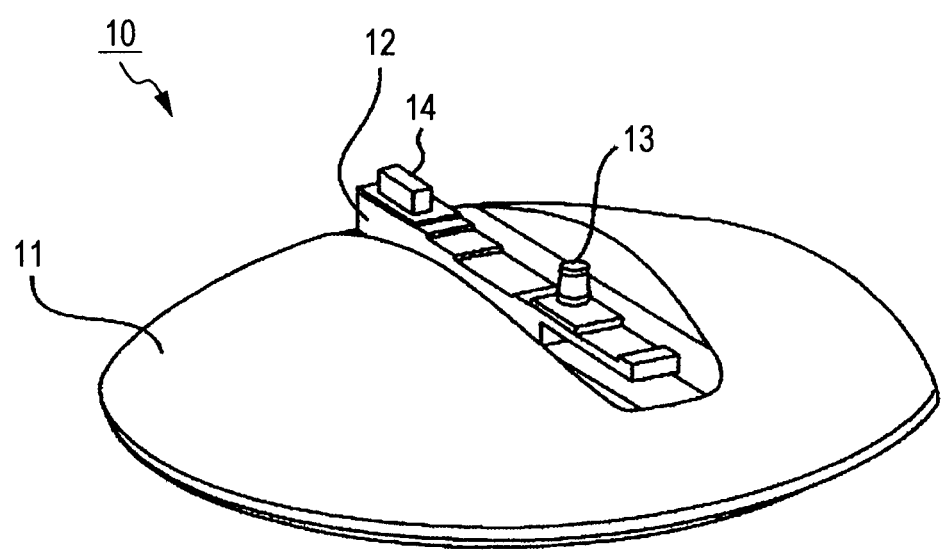
FIG. 2 is a perspective view illustrating an example of the outer appearance of a pan/tilt head forming the imaging system of the embodiment.
Figure 3:
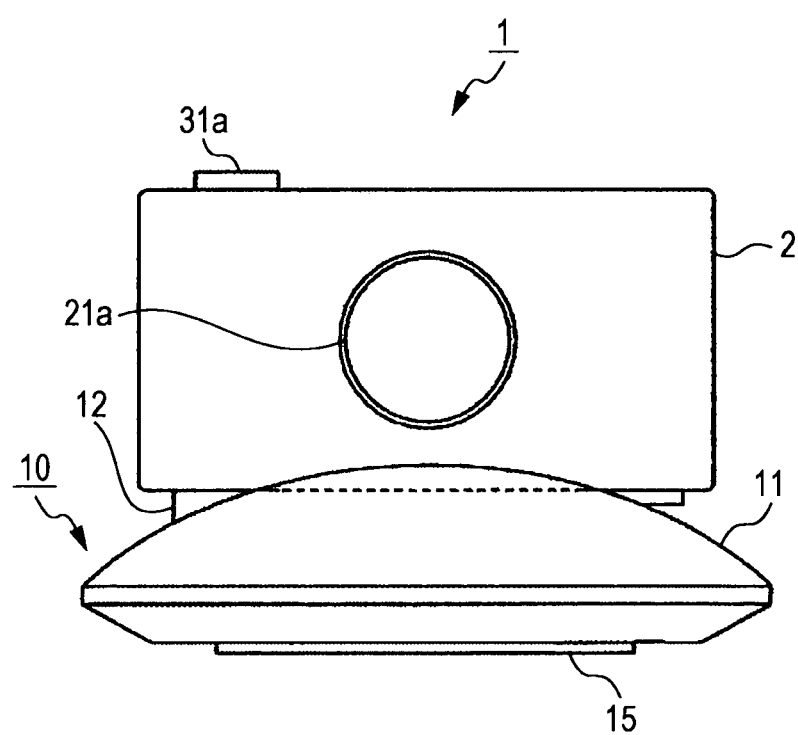
FIG. 3 is a front view illustrating, as the imaging system of the embodiment, an example of the form in which a digital still camera is attached to a pan/tilt head.
Figure 4:
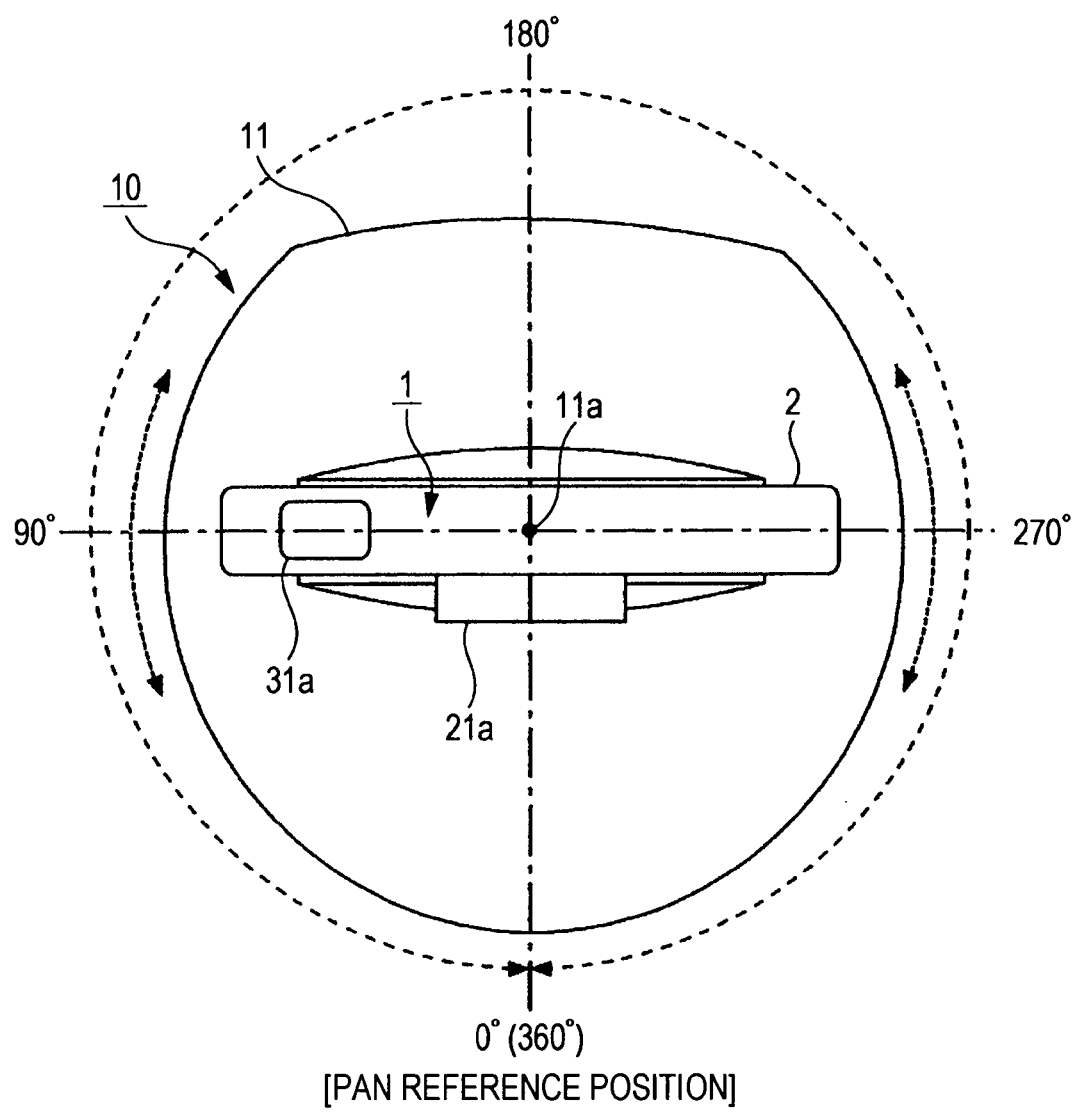
FIG. 4 is a plan view illustrating, as the imaging system of the embodiment, an example of the form in which a digital still camera is attached to a pan/tilt head, together with an example of a mode of the movement in the pan direction.
Figure 5:
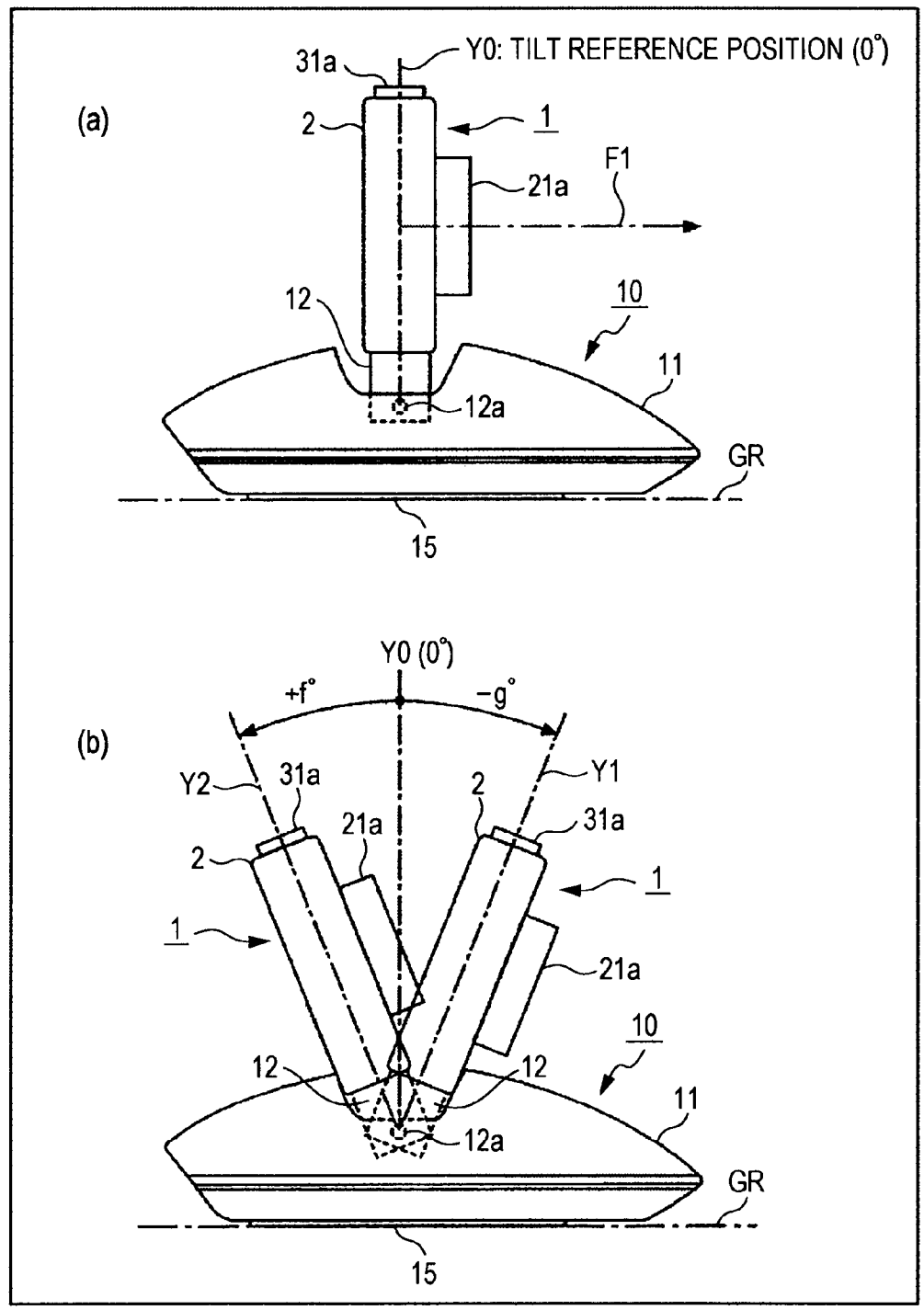
FIG. 5, which includes side views, illustrates, as the imaging system of the embodiment, an example of the form in which a digital still camera is attached to a pan/tilt head.

FIG. 2 is a perspective view illustrating the outer appearance of the pan/tilt head 10. FIGS. 3 through 5 illustrate, as outer appearances of the imaging system of the present embodiment, the states in which the digital still camera 1 is placed on the pan/tilt head 10 in suitable states. FIG. 3 is a front view, FIG. 4 is a plan view, and part (a) of FIG. 5 is a side view. Part (b) of FIG. 5 is a side view illustrating a movable range of a tilt mechanism.

As shown in FIGS. 2, 3, 4, and part (a) of FIG. 5, roughly speaking, the pan/tilt head 10 has a structure in which a main body unit 11 is placed on a grounding stand unit 13 and in which a camera stand unit 12 is attached to the main body unit 11.

When placing the digital still camera 1 on the pan/tilt head 10, the bottom side of the digital still camera 1 is placed on the top side of the camera stand unit 12.

In this case, as shown in FIG. 2, a projection 13 and a connector 14 are provided at the top side of the camera stand unit 12.

A hole, which is to be engaged with the projection 13, is formed at the bottom side of the main body unit 2 of the digital still camera 1, though it is not shown. In the state in which the digital still camera 1 is correctly placed on the camera stand unit 12, this hole is engaged with the projection 13. In this state, if a normal panning/tilting operation is performed, the digital still camera 1 is not displaced from or does not come off the pan/tilt head 10.

Also, a connector is provided at a predetermined position of the bottom side of the digital still camera 1. In the state in which the digital still camera 1 is correctly placed on the camera stand unit 12, as described above, the connector of the digital still camera 1 and the connector 14 of the pan/tilt head 10 are connected to each other so that at least intercommunication is ready to be performed.

It is noted that, in reality, the connector 14 and the projection 13, for example, are movable on the camera stand unit 12. On that basis, by the use of an adaptor that matches the configuration of the bottom side of the digital still camera 1, different types of digital still cameras can be placed on the camera stand unit 12 in the state in which they can communicate with the pan/tilt head 10.

Also, communication between the digital still camera 1 and the camera stand unit 12 may be performed wirelessly.

Also, in the state in which the digital still camera 1 is placed on the pan/tilt head 10, it may be configured such that charging is performed on the digital still camera 1 from the pan/tilt head 10. Further, it may also be configured such that a video signal, for example, a signal of images, which are played back by the digital still camera 1, is also transmitted to the pan/tilt head 10 and is further output from the pan/tilt head 10 to an external monitor device via a cable, wireless communication, etc. That is, the pan/tilt head 10 may be, not only used for changing the imaging field-of-view range of the digital still camera 1, but also provided with functions of a so-called cradle.

Next, the basic movements of the digital still camera 1 in the pan/tilt directions performed by the use of the pan/tilt head 10 will be described.

First, the basic movement in the pan direction is as follows.

In the state in which this pan/tilt head 10 is placed on the floor face, the bottom surface of the grounding stand unit 13 is grounded. In this state, as shown in FIG. 4, the main body unit 11 is adapted to rotate clockwise and counterclockwise about a rotational axis 11a. Accordingly, the imaging field-of-view range of the digital still camera 1 placed on the pan/tilt head 10 is changed in the left-and-right direction (horizontal direction). That is, the panning movement is provided.

On that basis, the pan mechanism of the pan/tilt head 10 in this case has a structure in which it can unlimitedly rotate at an angle of 360° or greater as desired either in the clockwise direction or in the counterclockwise direction.

Also, in the pan mechanism of this pan/tilt head, the reference position in the pan direction is determined.

Here, as shown in FIG. 4, the pan reference position is set to be 0° (360°), and then, the rotation position of the main body unit 11 in the pan direction, i.e., the pan position, is expressed from 0° to 360°.

Also, the basic movement of the pan/tilt head 10 in the tilt direction is as follows.

The movement in the tilt direction is obtained, as shown in part (a) of FIG. 5 and part (b) of FIG. 5, by moving the camera stand unit 12 about a rotational axis 12a in both directions of the elevation angle and the depression angle.

Part (a) of FIG. 5 illustrates a state in which the camera stand unit 12 is placed at the tilt reference position Y0(0°). In this state, the imaging direction F1 that matches the imaging optical axis of the lens unit 21a (optical system unit) is parallel to the ground surface GR on which the grounding stand unit 13 is grounded.

On that basis, first, in the direction of elevation angle, as shown in part (b) of FIG. 5, the camera stand unit 12 is able to rotate about the rotational axis 12a in a range from the tilt reference position Y0(0°) to a predetermined maximum rotation angle +f°. In the direction of depression angle, too, the camera stand unit 12 is able to rotate about the rotational axis 12a in a range from the tilt reference position Y0(0°) to a predetermined maximum rotation angle −g°. In this manner, the camera stand unit 12 moves in a range from the maximum rotation angle +f° to the maximum rotation angle −g° on the basis of the tilt reference position Y0(0°). Accordingly, the imaging field-of-view range of the digital still camera 1 placed on the pan/tilt head 10 (camera stand unit 12) changes in the up-and-down direction (vertical direction). That is, the tilting operation is obtained.

The configurations of the outer appearances of the pan/tilt head 10 shown in FIGS. 2 through 5 are examples only. Other physical configurations and structures may be employed as long as the pan/tilt head 10 is able to move the digital still camera 1 placed on the pan/tilt head 10 in the pan direction and in the tilt direction.

[1-2. Digital Still Camera]

Figure 6:
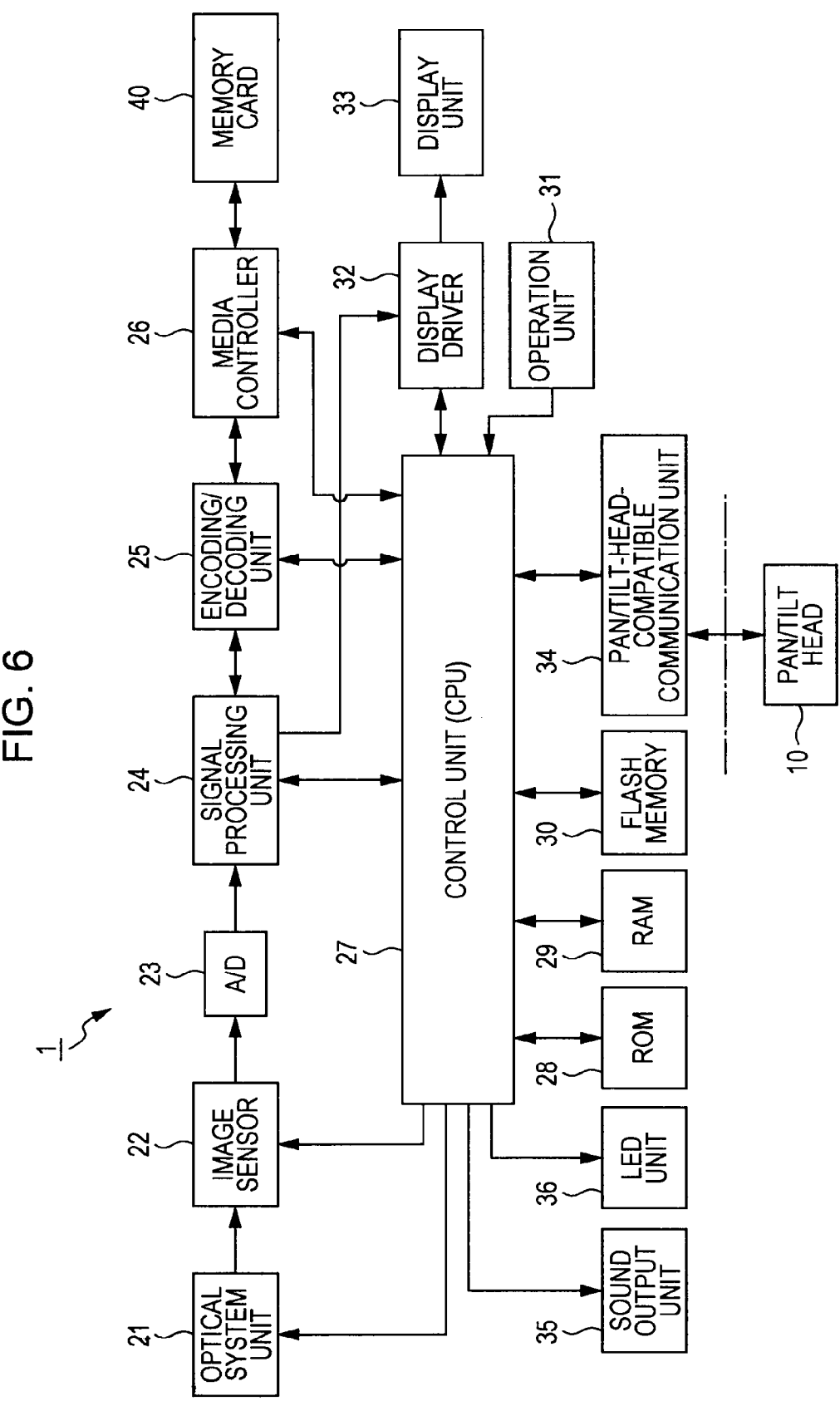
FIG. 6 is a block diagram illustrating an example of the configuration of a digital still camera.

The block diagram of FIG. 6 first illustrates an example of the practical internal configuration of the digital still camera 1.

In this diagram, first, an optical system unit 21 includes an imaging lens group containing a predetermined number of lenses, for example, a zoom lens and a focus lens, and a diaphragm. The optical system unit 21 causes incident light, as imaging light, to be imaged on the light-receiving surface of an image sensor 22.

Also, the optical system unit 21 includes a drive mechanism for driving the above-described zoom lens, focus lens, diaphragm, etc. The operation of the drive mechanism is controlled by so-called camera control, such as zoom (angle of view) control, automatic focusing control, automatic exposure control, executed by, for example, a control unit 27.

The image sensor 22 performs, so-called photoelectric conversion, for converting imaging light obtained by the above-described optical system unit 21 into an electric signal. For this purpose, the image sensor 22 receives imaging light from the optical system unit 21 on the light-receiving surface of a photoelectric conversion device, and sequentially outputs signal charges, which are stored in accordance with the intensity of the received light, at predetermined times. Then, an electric signal (imaging signal) corresponding to the imaging light is output. It is noted that the photoelectric conversion device (imaging device) used as the image sensor 22 is not particularly restricted, and, under the current circumstances, for example, a CMOS sensor or a CCD (Charge Coupled Device), may be used. If a CMOS sensor is used, a device (component) corresponding to the image sensor 22 may include an analog-to-digital conversion unit corresponding to an A/D converter 23, which will be described next.

The imaging signal output from the above-described image sensor 22 is input into the A/D converter 23 where the imaging signal is converted into a digital signal. The digital signal is input into a signal processing unit 24.

The signal processing unit 24 receives the digital imaging signal from the A/D converter 23 in units of, for example, still images (frame images). The signal processing unit 24 then performs required signal processing on the imaging signal which has been input in units of still images as described above, thereby making it possible to generate captured image data (captured still image data), which is image signal data corresponding to one still image.

If the captured image data generated in the signal processing unit 24 as described above is to be recorded, as image information, on a memory card 40, which is a storage medium (storage medium device), the captured image data corresponding to one still image, for example, is output from the signal processing unit 24 to an encoding/decoding unit 25.

The encoding/decoding unit 25 performs compression-encoding on the captured image data in units of still images output from the signal processing unit 24 by using a predetermined still-image compression-encoding method, and then, adds a header, etc. to the captured image data in accordance with, for example, control of the control unit 27, thereby converting the captured image data into image data compressed into a predetermined format. Then, the encoding/decoding unit 25 transfers the image data generated in this manner to a media controller 26. The media controller 26 writes and records the transferred image data on the memory card 40 in accordance with control of the control unit 27. The memory card 40 used in this case is a storage medium that is configured to have an outer shape of, for example, a card format which complies with predetermined standards, and that is configured to contain therein a non-volatile semiconductor storage device, such as a flash memory. It is noted that the type and format other than those of the above-described memory card may be used for the storage medium for storing image data therein.

The signal processing unit 24 in accordance with the present embodiment is configured to execute image processing for detecting a subject, which will be described below, by using captured image data which has been obtained as described above.

Also, the digital still camera 1 causes a display unit 33 to perform image display by using captured image data obtained in the signal processing unit 24, thereby making it possible to display images which are currently captured, so-called through images. For example, the signal processing unit 24 receives an imaging signal output from the A/D converter 23 and generates captured image data corresponding to one still image, as described above. By repeating this operation, the signal processing unit 24 sequentially generates captured image data corresponding to frame images of moving pictures. Then, the signal processing unit 24 transfers the captured image data which has been sequentially generated in this manner to a display driver 32 in accordance with control of the control unit 27. With this operation, through images are displayed.

The display driver 32 generates a drive signal for driving the display unit 33 on the basis of the captured image data input from the signal processing unit 24 as described above, and outputs the drive signal to the display unit 33. Accordingly, in the display unit 33, images based on the captured image data in units of still images are sequentially displayed. When the user views this, images that are being captured are displayed in the display unit 33 as moving pictures. That is, through images are displayed.

Also, the digital still camera 1 plays back image data recorded on the memory card 40 so as to display the images on the display unit 33.

For this purpose, the control unit 27 specifies image data and instructs the media controller 26 to read the data from the memory card 40. In response to this instruction, the media controller 26 accesses the address on the memory card 40 at which the specified image data is recorded, reads the data, and transfers the read data to the encoding/decoding unit 25.

In accordance with control of the control unit 27, for example, the encoding/decoding unit 25 extracts actual data, as compressed still image data, from the captured image data transferred from the media controller 26, and executes decoding processing, which corresponds to the compression-encoding, on this compressed still image data, thereby obtaining captured image data corresponding to one still image. Then, the encoding/decoding unit 25 transfers this captured image data to the display driver 32. Thus, the images represented by the captured image data recorded on the memory card 40 are played back and displayed in the display unit 33.

Also, in addition to the above-described through images and playback images of the image data, user interface images (operation images) can be displayed in the display unit 33. In this case, the control unit 27 generates display image data as a user interface image which is required by the control unit 27, for example, in accordance with the current operation state, and outputs the display image data to the display driver 32. Accordingly, the user interface image is displayed in the display unit 33. It is noted that this user interface image may be displayed as, for example, a specific menu screen, on the display screen of the display unit 33, separately from a monitor image or a playback image of the captured image data, or that the user interface image may be displayed such that it is superposed on or combined with part of the monitor image or the playback image of the captured image data.

In reality, the control unit 27 includes, for example, a CPU (Central Processing Unit), and forms a microcomputer together with a ROM 28, a RAM 29, etc. In the ROM 28, in addition to programs executed by the CPU, which serves as the control unit 27, various items of setting information related to the operation of the digital still camera 1 are stored. The RAM 29 is used as a primary storage device for the CPU.

Also, in this case, a flash memory 30 is provided as a non-volatile storage area, which is used for storing various items of setting information that are necessary to be changed (rewritten) in accordance with, for example, a user operation or an operation log. It is noted that, if a non-volatile memory, typically, a flash memory is used as the ROM 28, instead of the flash memory 30, part of the storage area of the ROM 28 may be used.

An operation unit 31 integrates various operators provided in the digital still camera 1 and an operation-information-signal output section for generating operation information signals in accordance with operations performed on those operators and for outputting the operation information signals to the CPU. The control unit 27 executes predetermined processing in accordance with an operation information signal received from the operation unit 31. Thus, the operation of the digital still camera 1 corresponding to a user operation is performed.

A sound output unit 35 is a section that outputs electronic sound by using a predetermined tone and voice pattern in order to provide, for example, a predetermined content of notification, under the control of the control unit 27.

An LED unit 36 includes an LED (Light Emitting Diode) that protrudes from the front surface of the casing of the digital still camera 1, and a circuit unit that drives this LED so that the LED is turned ON and OFF. The LED unit 26 turns ON or OFF the LED under the control of the control unit 27. A predetermined content of notification is provided in accordance with a pattern obtained by turning ON or OFF this LED.

A pan/tilt-head-compatible communication unit 34 is a section for performing communication between the pan/tilt head 10 and the digital still camera 1 in accordance with a predetermined communication method. The pan/tilt-head-compatible communication unit 34 includes a physical layer configuration that enables wired or wireless sending and receiving of a communication signal with the communication unit of the pan/tilt head 10 in the state in which the digital still camera 1 is attached to the pan/tilt head 10. The pan/tilt-head-compatible communication unit 34 also includes a configuration that implements communication processing corresponding to a predetermined layer higher than the physical layer. The above-described physical layer configuration includes a connector to be connected to the connector 14 shown in FIG. 2.

[1-3. Pan/Tilt Head]

Figure 7:
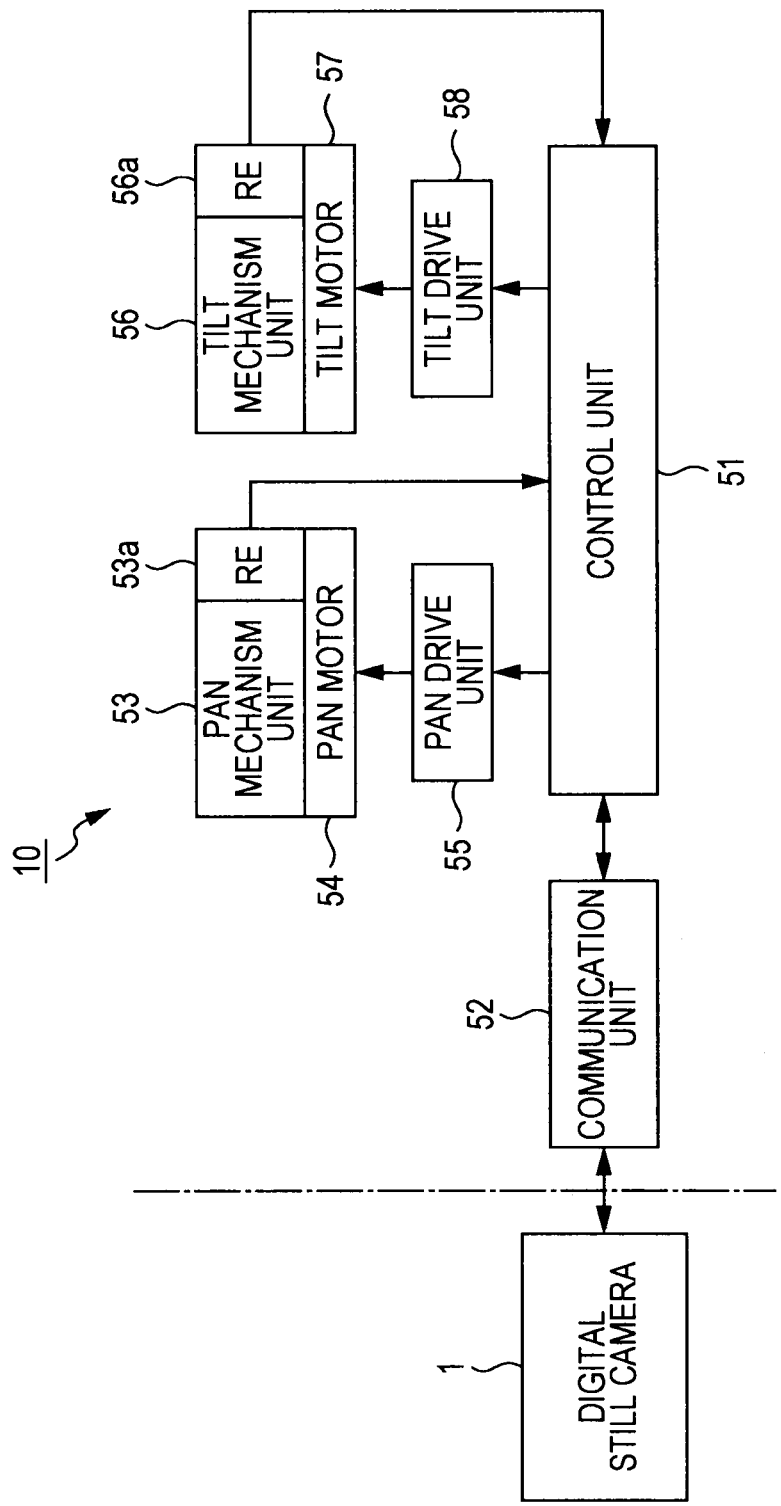
FIG. 7 is a block diagram illustrating an example of the configuration of a pan/tilt head.

The block diagram of FIG. 7 illustrates an example of the internal configuration of the pan/tilt head 10.

As described above, the pan/tilt head 10 includes a pan/tilt mechanism, and, as sections corresponding to the pan/tilt mechanism, the pan/tilt head 10 includes, a pan mechanism unit 53, a pan motor 54, a tilt mechanism unit 56, and a tilt motor 57.

The pan mechanism unit 53 has a mechanism for applying the movement in the pan (horizontal/left-and-right) direction shown in FIG. 4 to the digital still camera 1 which is attached to the pan/tilt head 10. The movement of this mechanism is obtained by causing the pan motor 54 to rotate in the forward direction and in the reverse direction. Similarly, the tilt mechanism unit 56 has a mechanism for applying the movement in the tilt (vertical/up-and-down) direction shown in part (b) of FIG. 5 to the digital still camera 1 which is attached to the pan/tilt head 10. The movement of this mechanism is obtained by causing the tilt motor 57 to rotate in the forward direction and in the reverse direction.

A control unit 51 includes a microcomputer which is formed by a combination of, for example, a CPU, a ROM, a RAM, etc., and controls the movements of the above-described pan mechanism unit 53 and tilt mechanism unit 56. For example, when the control unit 51 controls the movement of the pan mechanism unit 53, it outputs a signal indicating the direction in which the pan mechanism unit 53 is to be moved and the moving speed to a pan drive unit 55. The pan drive unit 55 generates a motor drive signal corresponding to the input signal and outputs the motor drive signal to the pan motor 54. If, for example, a motor is a stepper motor, the motor drive signal is a pulse signal corresponding to PWM control.

This motor drive signal causes the pan motor 54 to rotate, for example, in a required rotation direction at a required rotation speed. As a result, the pan mechanism unit 53 is driven to move in the moving direction at the moving speed corresponding to the rotation direction and the rotation speed, respectively.

Similarly, when the control unit 51 controls the movement of the tilt mechanism unit 56, it outputs a signal indicating a moving direction and a moving speed required for the tilt mechanism unit 56 to a tilt drive unit 58. The tilt drive unit 58 generates a motor drive signal corresponding to the input signal and outputs the motor drive signal to the tilt motor 57. This motor drive signal causes the tilt motor 57 to rotate, for example, in a required rotation direction at a required rotation speed. As a result, the tilt mechanism unit 56 is driven to move in the moving direction at the moving speed corresponding to the rotation direction and the rotation speed, respectively.

The pan mechanism unit 53 also includes a rotary encoder (rotation detector) 53*a*. The rotary encoder 53*a* outputs, to the control unit 51, a detection signal indicating a rotation angle obtained in accordance with the rotation of the pan mechanism unit 53. Similarly, the tilt mechanism unit 56 includes a rotary encoder 56*a*. This rotary encoder 56*a* also outputs, to the control unit 51, a detection signal indicating a rotation angle obtained in accordance with the rotation of the tilt mechanism unit 56.

A communication unit 52 is a section that performs, in accordance with a predetermined communication method, communication with the pan/tilt-head-compatible communication unit 34 provided in the digital still camera 1 attached to the pan/tilt head 10. As in the pan/tilt-head-compatible communication unit 34, the communication unit 52 includes a physical layer configuration that enables wired or wireless sending and receiving of a communication signal to and from the communication unit of the other party. The communication unit 52 also includes a configuration that implements communication processing corresponding to a predetermined layer higher than the physical layer. The above-described physical layer configuration includes the connector 14 of the camera stand unit 12 shown in FIG. 2.

2. Examples of Functional Configurations Corresponding to Composition Control of Embodiment Next, examples of the functional configurations, which are implemented by hardware and software (program), of the digital still camera 1 and the pan/tilt head 10 forming the imaging system according to the present embodiment are shown in the block diagram of FIG. 8.

In this diagram, the digital still camera 1 includes an image-recording block 61, a composition decision block 62, a pan/tilt/zoom control block 63, and a communication control processing block 64.

The image-recording block 61 is a section that performs control processing for obtaining a captured image as data of an image signal (captured image data) and for storing this captured image data in a storage medium. This section is a section including, for example, an imaging optical system, an imaging device (image sensor), a signal processing circuit that generates captured image data from a signal output from the imaging device, and a recording control/processing system for writing and recording (storing) the captured image data in a storage medium.

In this case, the recording (image-recording) of captured image data by the image-recording block 61 is performed in accordance with an instruction and control of the composition decision block.

The composition decision block 62 receives and inputs captured image data output from the image-recording block 61. On the basis of this captured image data, the composition decision block 62 first detects a subject and finally executes processing for deciding a composition.

In the present embodiment, when performing this composition decision, attributes, which will be discussed later, are also detected for each of the subjects detected by subject detection. Then, when executing composition decision processing, the optimum composition is decided by utilizing the detected attributes. Further, framing control for obtaining captured image data representing the image content based on the decided composition is also executed.

Subject detection processing (including setting of an initial face frame) executed by the composition decision block 62 can be executed by using the signal processing unit 24 shown in FIG. 6. The subject detection processing performed by the signal processing unit 24 can be implemented by image signal processing by using a DSP (Digital signal Processor). That is, the subject detection processing can be implemented by a program and an instruction supplied to the DSP.

Also, the correction for a face frame, composition decision, and framing control executed by the composition decision block 62 can be implemented as processing executed by the CPU, which serves as the control unit 27, in accordance with a program.

The pan/tilt/zoom control block 63 executes pan/tilt/zoom control in accordance with an instruction from the composition decision block 62 in order to obtain the composition and the imaging field-of-view range corresponding to the decided optimum composition. More specifically, as framing control, the composition decision block 62 specifies, for the pan/tilt/zoom control block 63, the above-described composition and imaging field-of-view range which are to be obtained in accordance with the decided optimum composition. The pan/tilt/zoom control block 63 determines the moving distances of the pan/tilt mechanisms of the pan/tilt head 10 so that the digital still camera 1 faces in the imaging direction in order to obtain the specified composition and imaging field-of-view range. The pan/tilt/zoom control block 63 then generates a pan/tilt control signal for specifying the movement corresponding to the determined moving distances.

The pan/tilt/zoom control block 63 determines the position of the zoom lens (zoom magnification) for obtaining the determined suitable angle of view, and controls a zoom mechanism provided for the image-recording block 61 so that the zoom mechanism is placed at the zoom position.

The communication control processing block 64 is a section for performing communication with a communication control processing block 71 provided in the pan/tilt head 10 in accordance with predetermined communication protocols. A pan/tilt control signal generated by the pan/tilt/zoom control block 63 is sent to the communication control processing block 71 of the pan/tilt head 10 through communication performed by the communication control processing block 64.

The pan/tilt head 10 includes, for example, the communication control processing block 71 and a pan/tilt control processing block 72, as shown in the drawing.

The communication control processing block 71 is a section for performing communication with the communication control processing block 64 of the digital still camera 1, and when receiving the above-described pan/tilt control signal, the communication control processing block 71 outputs this pan/tilt control signal to the pan/tilt control processing block 72.

Among the control processing operations executed by the control unit 51 (microcomputer) of the pan/tilt head 10 shown in FIG. 7, the pan/tilt control processing block 72 serves as a function of executing processing concerning pan/tilt control.

This pan/tilt control processing block 72 controls a pan drive mechanism unit and a tilt drive mechanism unit, which are not shown here, in accordance with an input pan/tilt control signal. With this control, panning/tilting for obtaining a required horizontal viewing angle and a required vertical viewing angle in accordance with the optimum composition is performed.

The pan/tilt/zoom control block 63 is also able to perform pan/tilt/zoom control for searching for a subject in accordance with, for example, a command from the composition decision block 62.

3. Example of Algorithm that can be Considered as Automatic Image-Recording Function In the imaging system configured as described above, the pan/tilt mechanisms of the pan/tilt head 10 are driven to change the imaging field-of-view range of the digital still camera 1, thereby detecting a subject to be contained within a captured image. Then, if a subject is detected, it can be imaged and recorded in such a manner that it is contained in a frame with a certain composition. That is, an automatic image-recording function is provided.

Figure 9:
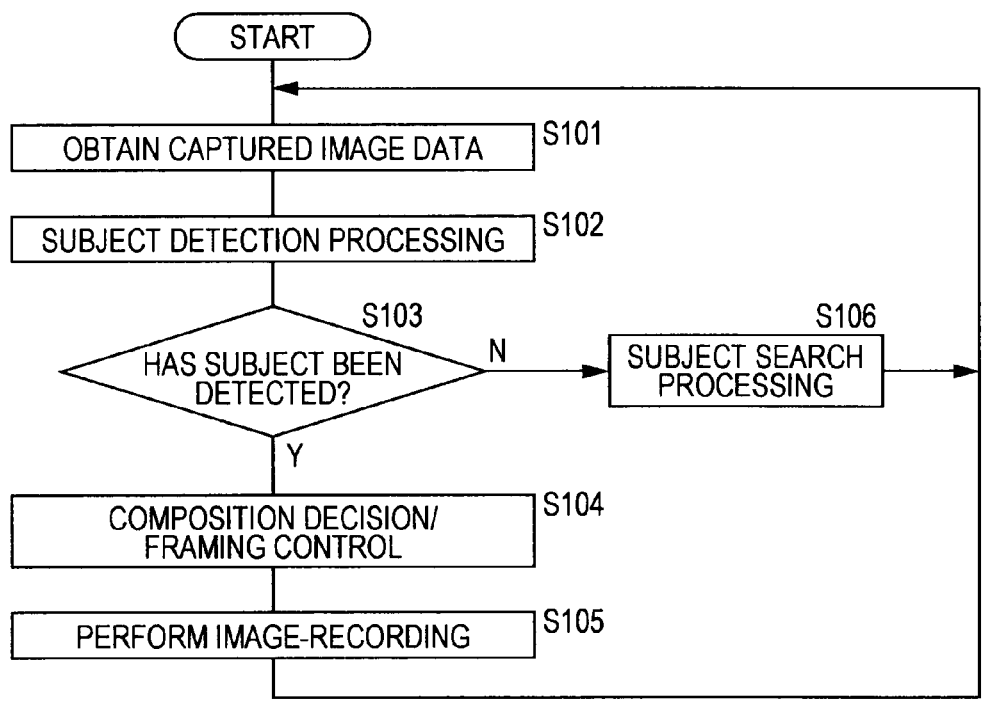
FIG. 9 is a flowchart illustrating an example of an algorithm that can be considered as an appropriate algorithm in order to implement an automatic image-recording function.

The flowchart of FIG. 9 illustrates an example of an algorithm that can be considered as an appropriate algorithm in order to implement such an automatic image-recording function.

Figure 8:
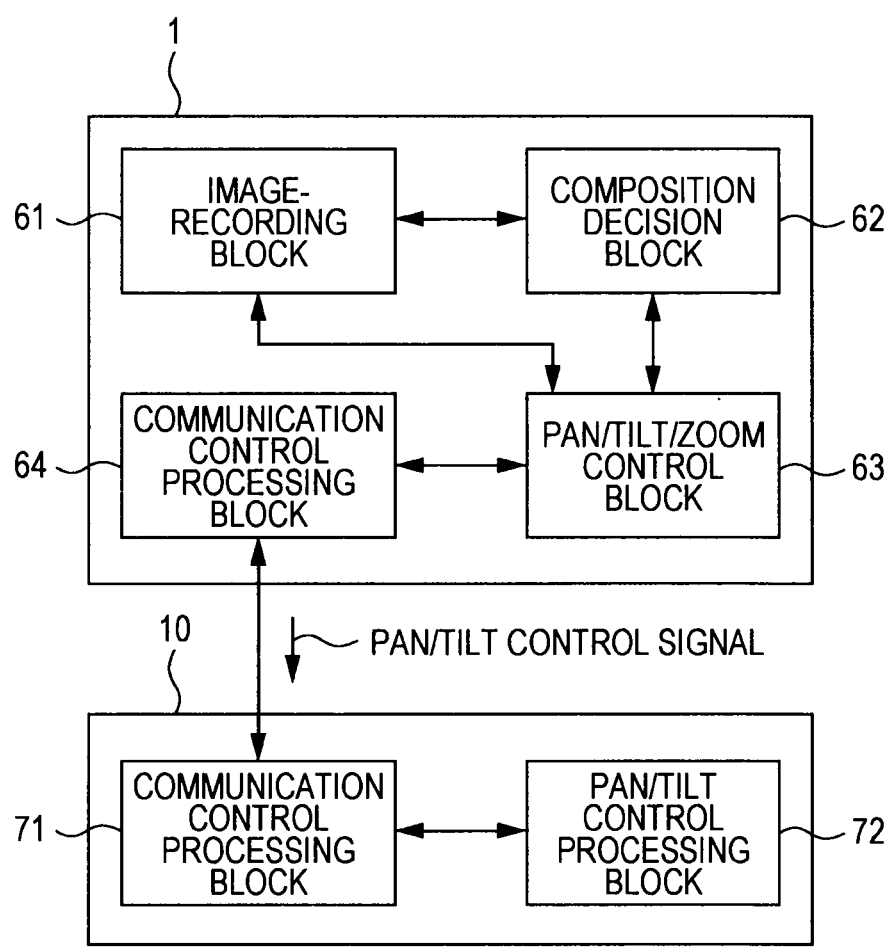
FIG. 8 is a block diagram illustrating the functions provided for a digital still camera of the embodiment to deal with composition control.

It is noted that the steps shown in this diagram are appropriately executed by the functional blocks (image-recording block 61, composition decision block 62, pan/tilt/zoom control block 63, and communication control processing block 64) of the digital still camera 1 shown in FIG. 8.

In FIG. 9, first, in step S101, the composition decision block 62 receives and obtains captured image data that is currently obtained by the image-recording block 61. In step S102, the composition decision block 62 executes subject detection processing for this obtained captured image data.

As the subject detection processing in step S102, a face detection technique, for example, may be applied, as described above, and as a detection result thereof, for example, the number of subjects, the sizes of subjects, the positions of subjects in an image, etc., can be obtained.

Then, in step S103, the composition decision block 62 determines whether a subject has been detected as a result of the subject detection processing in the above-described step S102. If a negative determination result is obtained, subject search processing is started in step S106, and the process returns to step S101.

This subject search processing is the following processing. The pan/tilt/zoom control block 63 instructs, through the communication control processing block 64, the pan/tilt head 10 to move in the pan/tilt directions, and also performs zoom control, if necessary, thereby changing the imaging field-of-view range with a predetermined pattern in accordance with the lapse of time. With this control, subjects around the digital still camera 1 are captured in such a manner that they are contained in the imaging field-of-view range.

In contrast, if a positive determination result is obtained in step S103 since a subject has been detected, the process proceeds to step S104.

In step S104, the composition decision block 62 decides the optimum composition for the detected subject, and executes framing control for obtaining the decided composition as the content of an image within the frame of the captured image data.

The elements forming the decided composition here include, for example, the size of the subject in the frame, the position of the subject within the frame, etc.

Then, if the framing control has been executed, in step S105, the composition decision block 62 instructs the image-recording block 61 to execute image-recording. In response to this, the image-recording block 61 performs an operation for recording the currently obtained captured image data on the memory card 40 as a still image file.

According to the algorithm shown in FIG. 9, if a subject is detected, an operation for image-recording the detected subject with a certain composition which contains the detected subject is automatically performed. That is, an automatic image-recording operation for automatically recording captured image data containing, for example, a person, as a subject is obtained.

However, when actually executing the automatic image-recording operation in accordance with the algorithm shown in FIG. 9, only the same subject that was detected first has been image-recorded. That is, despite that many persons that can be a subject are present around the imaging system of the present embodiment, among those persons, only the subject that was detected first is image-recorded many times.

Such an operation leads to the result that the photos of only a specific subject are taken and collected, which is not interesting as the content of the photos. In the present embodiment, therefore, in order to avoid such an inconvenience, the following configuration is proposed. Subjects which are present around an imaging system are image-recorded as evenly as possible without concentrating on a specific subject.

4. Basic Example of Automatic Image-Recording Algorithm According to Embodiment (First Embodiment)

Figure 10:
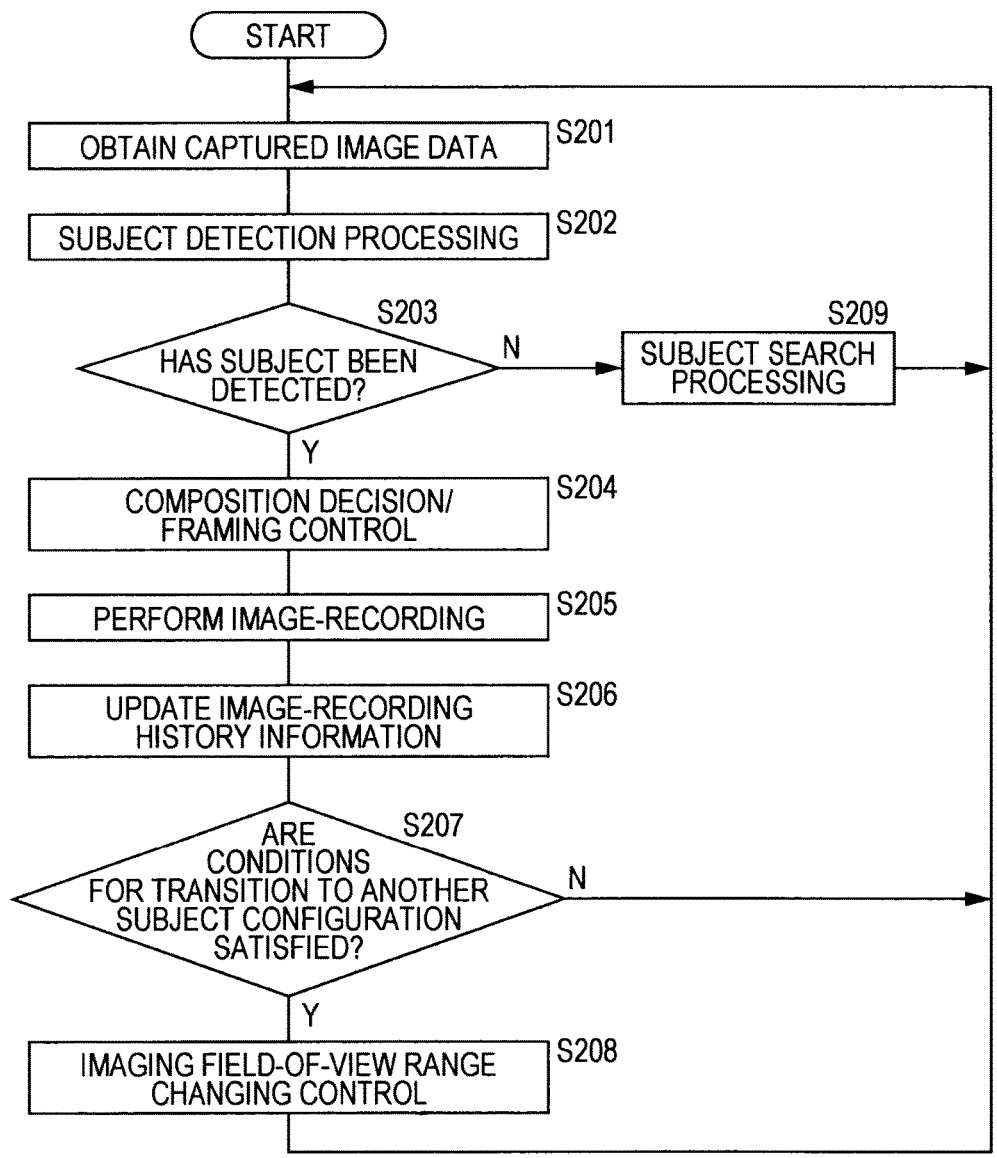
FIG. 10 is a flowchart illustrating an example of an algorithm, which serves as a base for composition control, as the present embodiment (first embodiment).

The flowchart of FIG. 10 illustrates an example of the automatic image-recording algorithm as the first embodiment. The processing shown in this diagram is the most basic algorithm for the configurations of the second and subsequent embodiments, which will be discussed later.

It is noted that the steps shown in this diagram are also appropriately executed by the functional blocks (image-recording block 61, composition decision block 62, pan/tilt/zoom control block 63, and communication control processing block 64) of the digital still camera 1 shown in FIG. 8.

Also, such a program may be written and stored in, for example, a ROM, at the time of manufacturing, or may be stored in a removable storage medium and then be installed (including updating) from this storage medium into a DSP-support non-volatile storage area or the flash memory 30. Alternatively, the program may be installed via a data interface under the control of another device, which serves as a host. Further, the program may be stored in a storage device of, for example, a server on the network. On that basis, a network function may be provided for the digital still camera 1 so that the digital still camera 1 is configured to download and obtain the program from the server.

In FIG. 10, steps S201 through S205 and step S209 are similar to steps S101 through S105 and step S106, respectively, of FIG. 9.

Then, in FIG. 10, upon completing the execution of image-recording one time in step S205, in step S206, the composition decision block 62 updates image-recording history information.

A specific example of the content and definition of this image-recording history information is different in accordance with the following embodiments. In any case, a determination result in the next step S207 is obtained in accordance with the content of the imaging-recording history information.

In step S207, the composition decision block 62 determines on the basis of the content of the current imaging-recording history information whether conditions for the transition to a subsequent subject configuration are satisfied.

The subject configuration described here is a combination of individual subjects obtained in an image represented by captured image data.

It is now assumed that an image including only subject A has been automatically recorded so far. In other words, an image formed of, as an element of the composition, a subject configuration including only the subject A is automatically image-recorded.

Then, if, for example, subjects B and C are also present in addition to the subject A, a combination of "other subject configurations" other than the subject configuration consisting of only the subject A may be as follows: "only subject B", "only subject C", "combination of subjects A and B", "combination of subjects A and C", "combination of subjects B and C", and "combination of subjects A, B, and C".

If a negative determination result is obtained in step S207, the process returns to step S201. In this case, in the above-described example, only the subject A, for example, is detected again in step S503. That is, the same subject configuration as that of the previous time is detected. Then, image-recording with the composition including only the subject A is performed again.

Then, as in the above-described manner, it is assumed that image-recording under conditions, e.g., the same subject configuration, is repeated a prescribed number of times. As a result of this, a positive determination result is obtained in step S207, and the process proceeds to step S208.

In step S208, the imaging field-of-view range changing control is performed in order to detect a subject of one of the above-described other subject configurations. That is, at least one of the pan control, tilt control, and zoom control is executed by using the pan/tilt/zoom control block 63 so as to change the imaging field-of-view range, and then, the process returns to step S201. If the imaging field-of-view range is changed, it is possible that a subject which has not been present in the image represented by the captured image data be detected. That is, it is possible that a subject structure which is at least different from that of the last image-recording be obtained.

It is noted that specific examples of imaging field-of-view range changing control corresponding to step S208 will be described by way of the following two examples.

As will be understood from the following description of the embodiments, in accordance with such control, it is at least possible that captured images with the same subject configuration be not recorded more than necessary. Also, if recording of captured images with one subject configuration is repeated a certain number of times, another subject configuration is searched for and is image-recorded. Accordingly, it is possible that persons, for example, as subjects, present around the imaging system of the present embodiment be image-recorded as evenly as possible without concerning on a certain subject. Thus, in the images (photos) represented by many image-recorded image data, persons around the imaging system are contained evenly, and such photos are interesting if the user looks at them later.

5. Example of Imaging Field-of-View Range Changing Control Algorithm (Second Embodiment)

Figure 11:
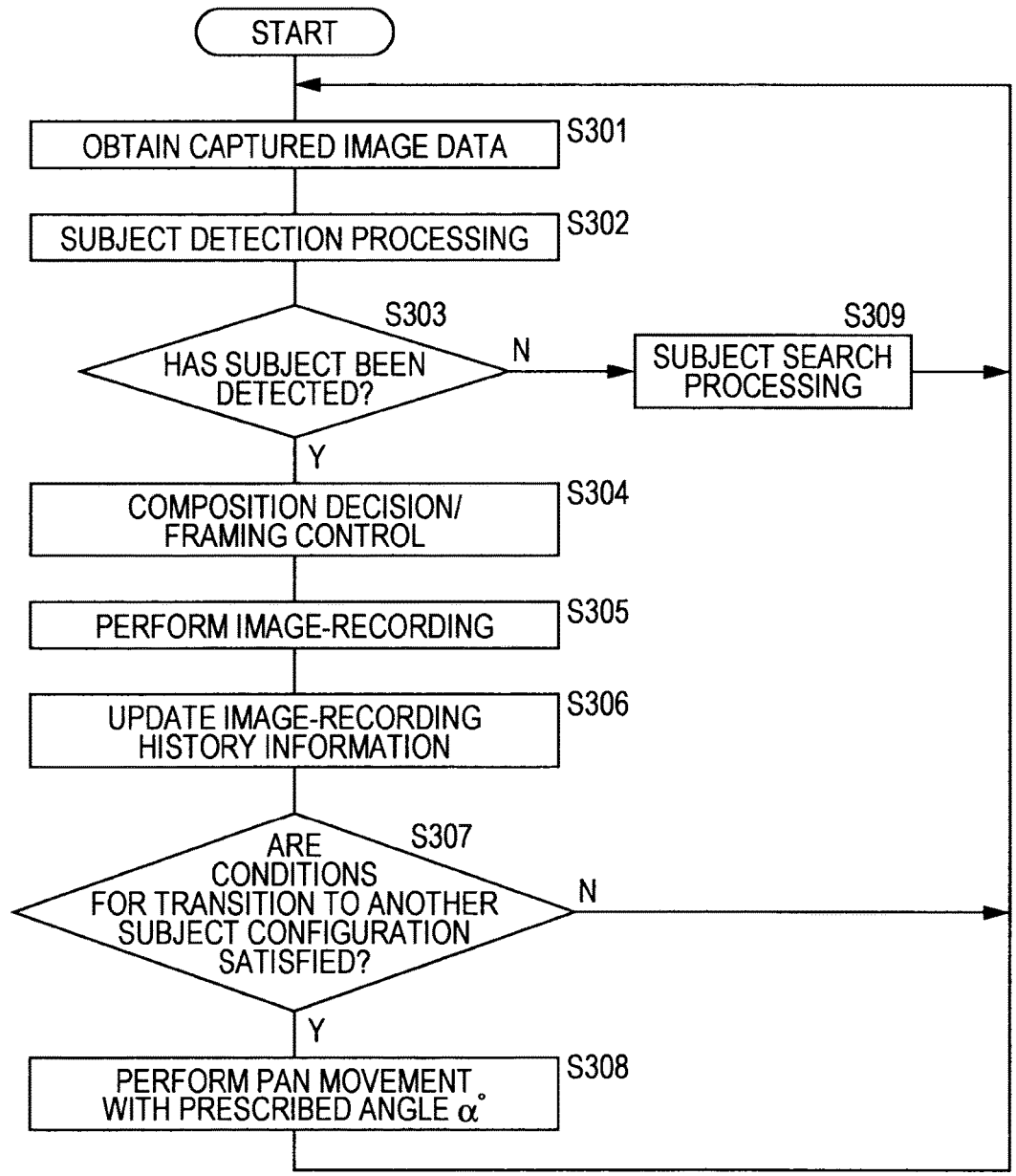
FIG. 11 is a flowchart illustrating an example of an algorithm for composition control, as a second embodiment.

The flowchart of FIG. 11 illustrates an example of composition control processing, as a second embodiment, including a specific example of the imaging field-of-view range changing control algorithm. It is noted that steps S301 through S307 and step S309 in this diagram are similar to steps S201 through S207 and step S209 of FIG. 10.

Step S308 of FIG. 11 corresponds to the imaging field-of-view range changing control in step S208 of FIG. 10.

In step S308, the pan/tilt/zoom control block 63 performs pan control so that the pan/tilt head 10 moves only by a prescribed angle $\alpha°$ in the pan direction.

There are several ways to determine the prescribed angle $\alpha°$. Examples of setting of the prescribed angle $\alpha°$ and examples of operations obtained by the setting of this prescribed angle $\alpha°$ in step S308 will be described with reference to FIG. 13.

Figure 13:
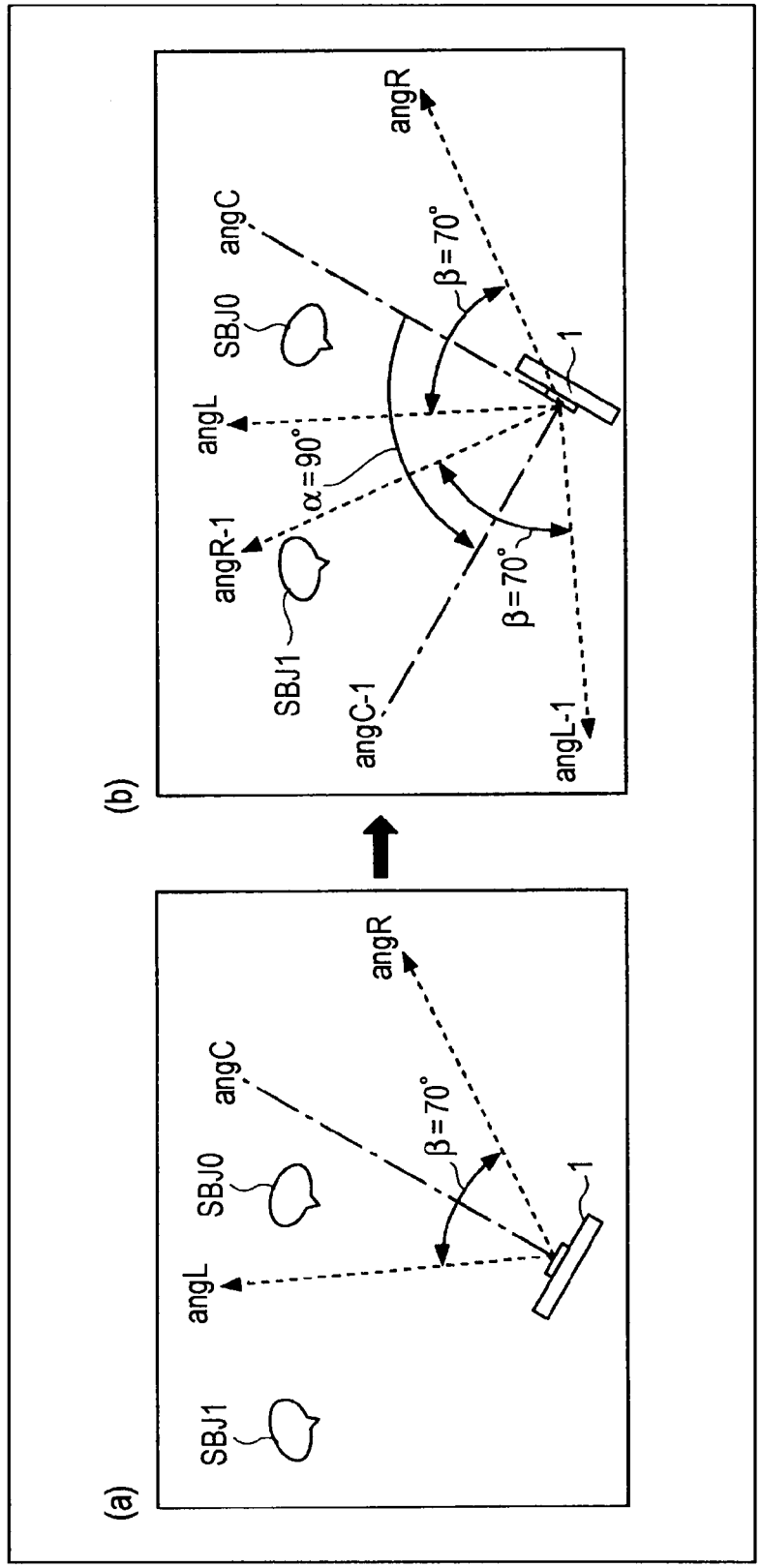
FIG. 13, which includes views, illustrates examples of operations obtained by imaging field-of-view range changing control as the second embodiment.

In part (a) of FIG. 13, the digital still camera 1 is observed from the top. It is noted that, although this digital still camera 1 is, in reality, fixed on the pan/tilt head 10, the pan/tilt head 10 is not shown for the sake of simple representation.

Also, the angle of view set for the digital still camera 1 is expressed by the center angle of view angC, the left-end angle of view angL, and the right-end angle of view angR. It is noted that the center angle of view angC coincides with the imaging optical axis of the digital still camera 1 and that the angle from the center angle of view angC to the left-end angle of view angL is the same as the angle from the center angle of view angC to the right-end angle of view angR. The imaging field-of-view range in the horizontal direction corresponds to the range from the left-end angle of view angL to the right-end angle of view angR. For the sake of description, it is now assumed that the imaging field-of-view range in the horizontal direction is set to be the widest angle of view (wide end). Then, here, the angle of view at the wide end is set to be 70°.

Then, it is now assumed that two subjects SBJ0 and SBJ1 are present, as shown in the drawing, around the digital still camera 1 and the pan/tilt head 10. It is also assumed that, for the sake of description, the subjects are not moved and the absolute positions thereof are fixed.

In the state of part (a) of FIG. 13, it is now assumed that, of the subjects SBJ0 and SBJ1, only the subject SBJ0 is contained in the imaging field-of-view range of the digital still camera 1. Then, it is now assumed that, as a result of performing, in the state shown in part (a) of FIG. 13, image-recording of captured image data containing the subject SBJ0 within a frame, for example, a predetermined number of times, according to the algorithm shown in FIG. 11, a positive determination result is obtained in step S307 since the conditions for the transition to another subject configuration are satisfied.

In accordance with the positive determination result in step S307, in step S308, the movement in the pan direction by a prescribed angle α° is performed.

In the example shown in FIG. 13, 90° is set as the absolute value of the prescribed angle α°. This is because the angle of view at the wide end of the digital still camera 1 is 70° and an appropriate value greater than this angle of view is set. That is, here, as the prescribed angle α°, a value greater than the angle of view of the digital still camera 1 is to be set.

Then, here, in step S308, the pan movement with a prescribed angle α°=90° in the counterclockwise direction is performed, as shown in part (b) of FIG. 13. Accordingly, the imaging field-of-view range (horizontal direction) of the digital still camera 1 is changed to a range from the left-end angle of view angL-1 to the right-end angle of view angR-1 in part (b) of FIG. 13.

In this manner, as a result of performing 90° pan movement in the counterclockwise direction (i.e., pan movement greater than the angle of view at the wide end), there is no overlapping portion of the imaging field-of-view range (from angL-1 to angR-1), which is newly obtained after performing pan movement, and the imaging field-of-view range (from angL to angR) before performing pan movement. Thus, although the subject SBJ0 has been contained within the imaging field-of-view range (from angL to angR) before performing pan movement, it extends to the outside the imaging field-of-view range (from angL-1 to angR-1) after performing pan movement. Instead, the subject SBJ1 is contained in the imaging field-of-view range (from angL-1 to angR-1) after performing pan movement. In this manner, in the imaging field-of-view range changing control shown in FIG. 11, the previously detected subject is omitted, and another subject configuration different from that used in the last image-recording is obtained.

It is noted that, in the imaging field-of-view range changing control (step S307) of FIG. 11, if there is no subject in the imaging field-of-view range after performing pan movement, no subject is detected. In this case, a negative determination result is obtained in step S303, and subject search control is executed in step S309.

Additionally, in the above description, in the imaging field-of-view range changing control in step S308, only pan movement is performed. However, in order to increase the possibility of a new subject being contained in the imaging field-of-view range, pan control for moving the digital still camera 1 to a predetermined pan position which is set as a position suitable for detecting a subject, or zoom control for returning to the wide end may be executed together.

6. Example of Imaging Field-of-View Range Changing Control Algorithm (Third Embodiment)

Figure 12:
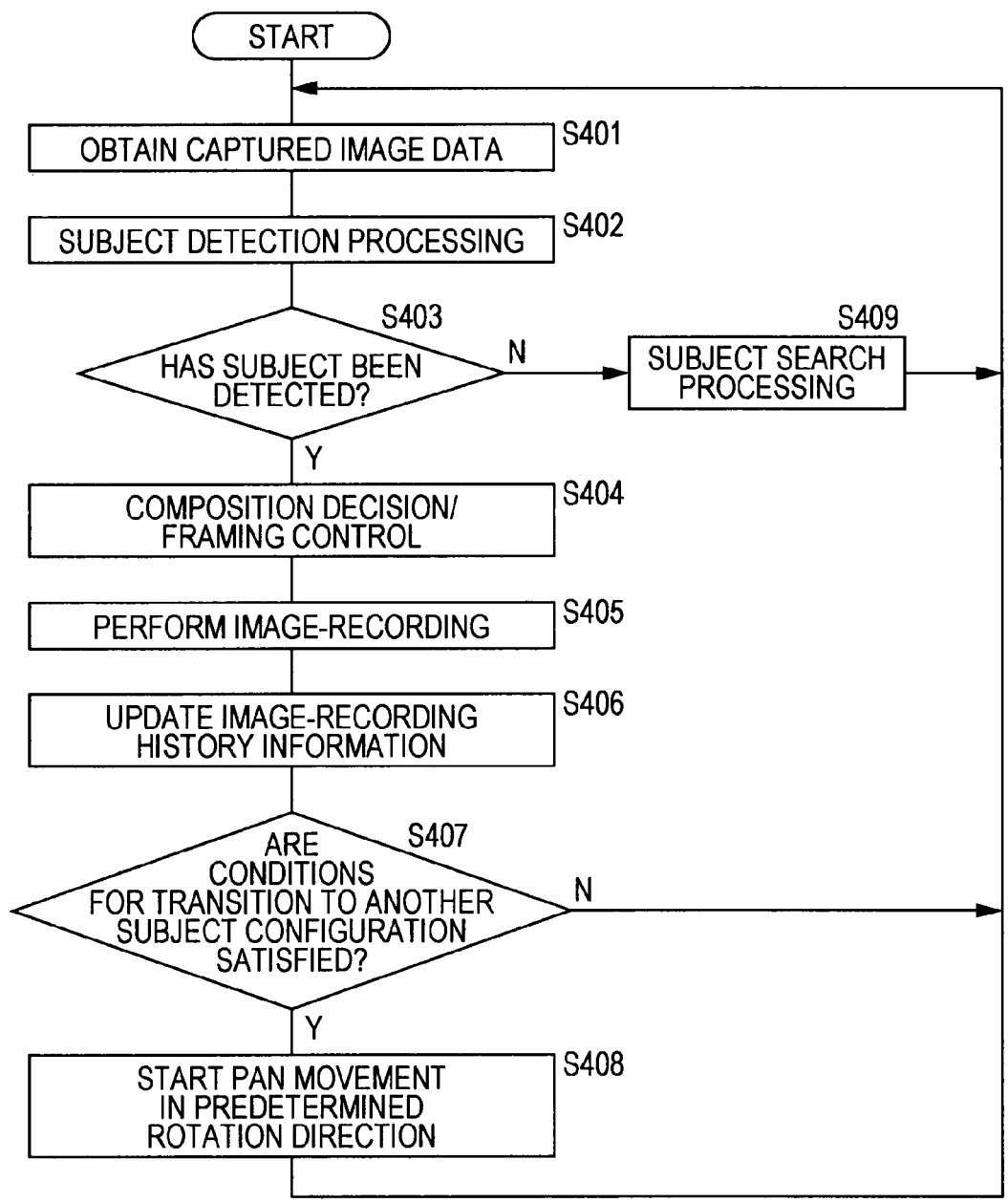
FIG. 12 is a flowchart illustrating an example of an algorithm for composition control, as a third embodiment.

The flowchart of FIG. 12 illustrates an example of composition control processing, as a third embodiment, including a specific example of the imaging field-of-view range changing control algorithm, which is different from the second embodiment. It is noted that steps S401, S402, S404 through S407, and step S409 in this diagram are similar to steps S101, S102, S104 through S107 and step S109 of FIG. 10.

In this case, processing in step S408 corresponds to the imaging field-of-view range changing control in step S208 of FIG. 10. In step S408, pan movement in the counterclockwise direction or in the clockwise direction is started by using the pan/tilt/zoom control block 63, and the process then returns to step S401.

When the process returns from step S408 to step S401, the image represented by captured image data is changed in accordance with a change in the imaging field-of-view range performed by pan movement. Then, in this state, subject detection processing is executed in step S402.

Here, in the determining processing in step S403, if the process returns from step S407 to step S401 and reaches step S403, a determination regarding whether a subject has been detected in the image represented by the captured image data is simply made.

In contrast, if the process returns from pan movement start control in step S407 to step S401 and reaches step S403, conditions for the determination are different from those described above. That is, in step S403 in this case, it is determined whether a new subject different from the subject which has been detected before executing step S408 (corresponding to the last image-recording) is detected as a result of the above-described subject detection processing. It is noted that, in this determination, the subject which has been detected before executing step S408 may still be detected, or may not be detected since it has extended to the outside the imaging field-of-view range at a certain time.

For example, even if the movement by a predetermined distance has been completed after starting pan movement in step S408, a negative determination result is obtained in step S403 if a new subject has not been detected. In this case, subject detection processing in step S409 is started, and the process returns to step S401.

In contrast, if a positive determination result is obtained since a new subject has been detected, the process proceeds to step S404 and the subsequent steps.

Figure 14:
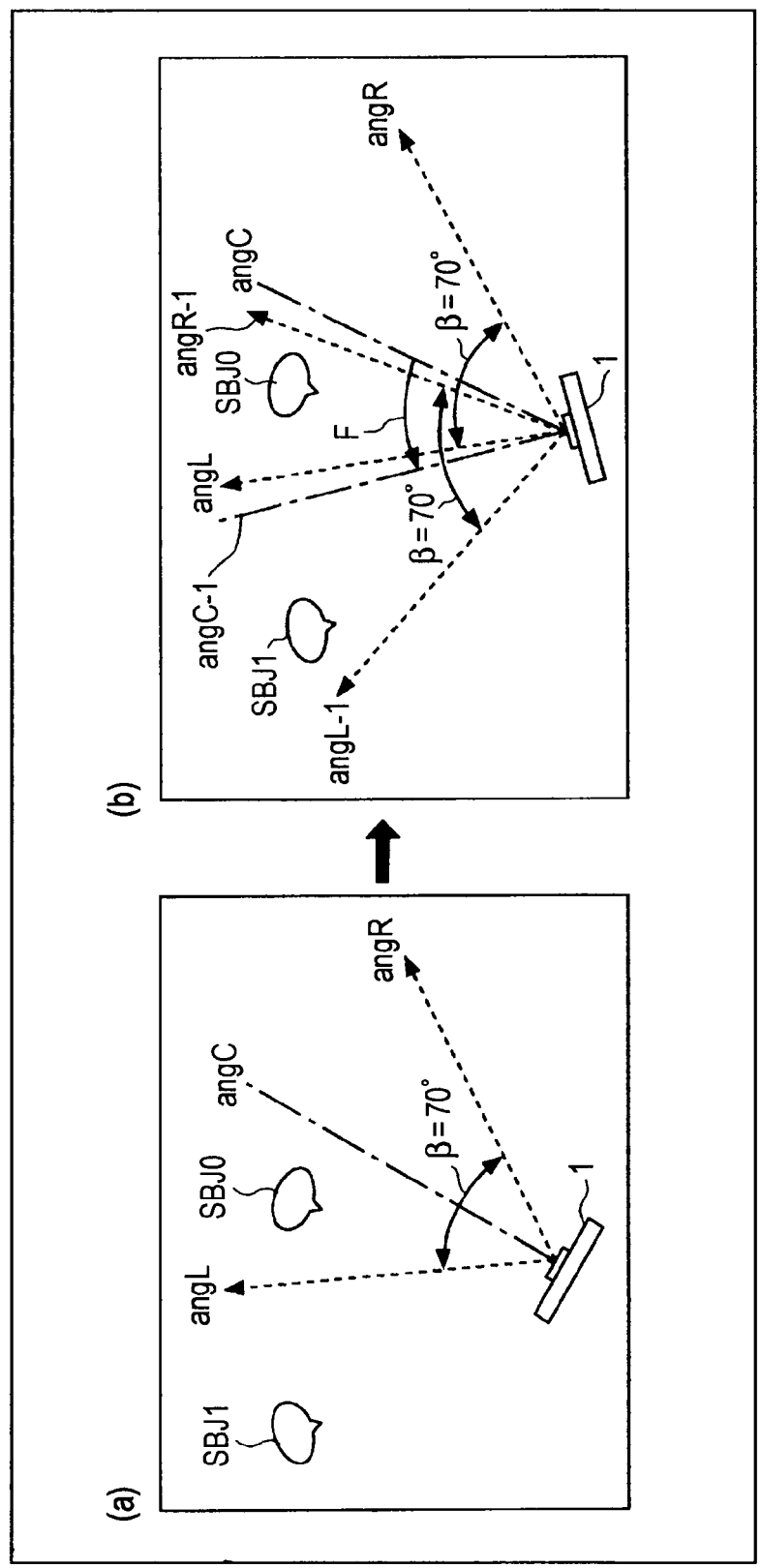
FIG. 14, which includes views, illustrates examples of operations obtained by imaging field-of-view range changing control as the third embodiment.

A specific example of the operation according to control in step S408 as the imaging field-of-view range changing control shown in FIG. 12 is shown in FIG. 14.

The same state as that shown in part (a) of FIG. 13 is shown in part (a) of FIG. 14. In this case, too, it is assumed that, in the state shown in part (a) of FIG. 14, as a result of performing image-recording by using a composition containing the subject SBJ0 a predetermined number of times, a positive determination result is obtained in step S407.

Accordingly, pan movement is started in the above-described step S408. It is now assumed that, here, pan movement in the counterclockwise direction is performed from the position shown in part (a) of FIG. 14.

Then, as shown in part (b) of FIG. 14, when pan movement is performed by an amount equal to a movement angle F from the position shown in part (a) of FIG. 14, the state in which the subject SBJ1 is contained in the imaging field-of-view range from the left-end angle of view angL-1 to the right-end angle of view angR-1 is obtained. In accordance with this state, a positive determination result is obtained in step S403, and the process proceeds to processing of step S404 and the subsequent steps.

Here, in the imaging field-of-view range from the left-end angle of view angL-1 to the right-end angle of view angR-1 after performing pan movement shown in part (b) of FIG. 14, not only the subject SBJ1, but also the subject SBJ0, which has been contained in the imaging field-of-view range from the left-end angle of view angL to the right-end angle of view angR before performing pan movement, is contained. In this manner, even if the subject SBJ0, which has been contained before performing pan movement, is present in the image, the subject configuration is expressed by a combination of the subject SBJ0 and the new subject SBJ1, and thus, it is different from that before performing pan movement (imaging field-of-view range changing control) in step S408. Then, if a positive determination result is obtained in step S403 in the state in part (b) of FIG. 14, a composition decision result corresponding to a composition formed of two subjects is obtained in the composition decision in step S404.

7. Example of Automatic Image-Recording Algorithm According to Transition Conditions (Fourth Embodiment)

Figure 15:
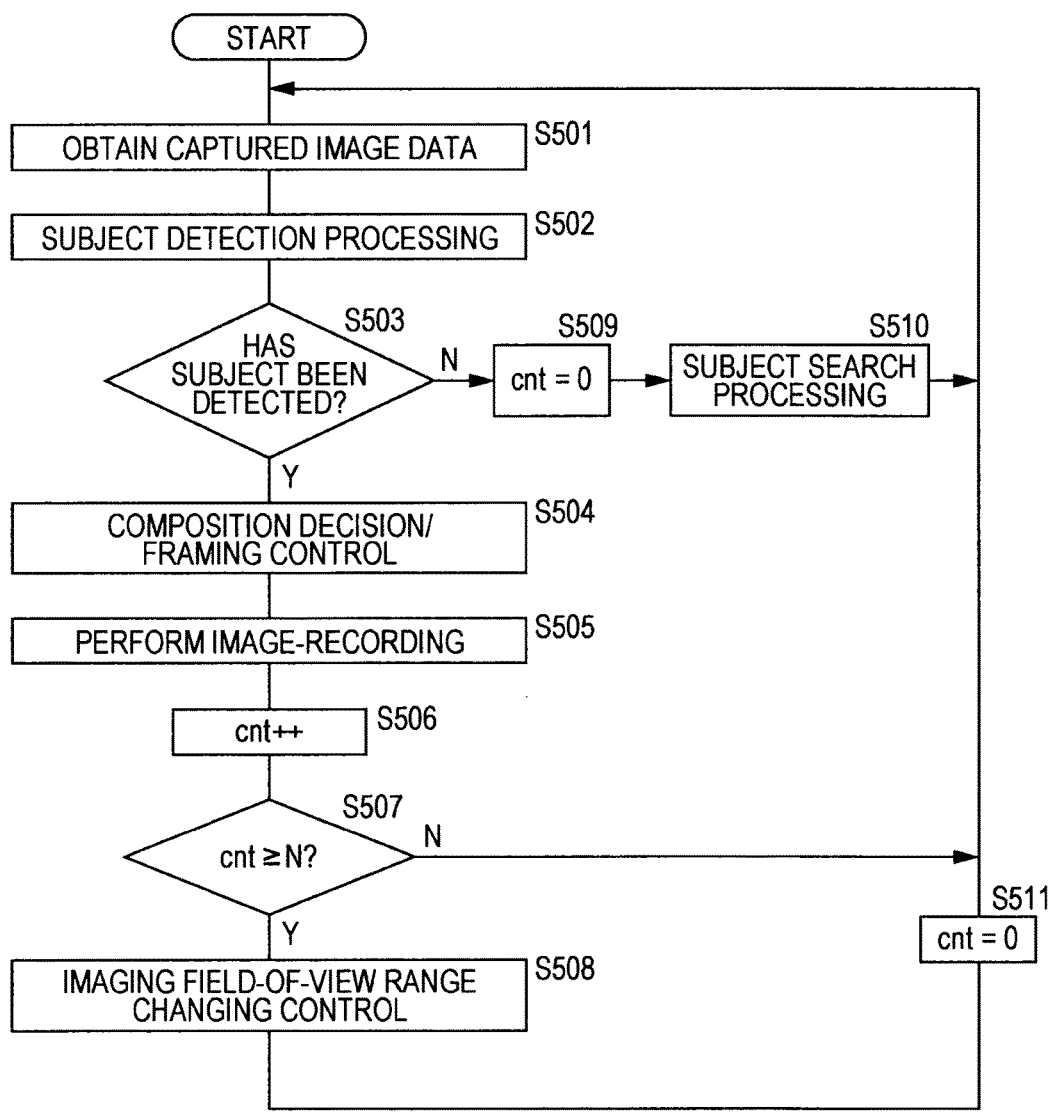
FIG. 15 is a flowchart illustrating an example of an algorithm for composition control, as a fourth embodiment.

The flowchart of FIG. 15 illustrates an example of a composition control algorithm, as a fourth embodiment, according to a specific example of conditions (transition conditions) for the transition to another subject configuration, which are determined in step S207 of FIG. 10.

In FIG. 15, steps S501 through S505, S508, and S510 are similar to steps S101 through S205, S208, and S209, respectively, of FIG. 10.

In FIG. 15, if a negative determination result is obtained in step S503 since no subject has been detected, in step S509, 0 is substituted into the count value cnt, and then, in step S510, subject search processing is started. The process then returns to step S501.

The count value cnt is, as will be understood from the following description, the number by which image-recording is continuously performed with the same subject configuration.

Every time image-recording is performed one time in step S505, processing for incrementing the count value cnt is executed in step S506. In the fourth embodiment, the updating of the image-recording history information in step S206 of FIG. 10 is executed as the updating of the count value cnt in step S506. That is, the image-recording history information in this case is information concerning the number by which image-recording is performed with the same subject configuration.

Then, a determination in step S207 of FIG. 10 regarding whether the transition conditions are satisfied is made by step S507. In step S507, it is determined whether the count value cnt is equal to or greater than a prescribed maximum value N. In this case, the prescribed maximum value N is, as the threshold, a value corresponding to a prescribed time for which the same subject configuration is to be continuously image-recorded.

If a negative determination result is obtained in step S507, image-recording is still to be performed with the same subject configuration, and thus, the process returns to step S501. Accordingly, in step S503, the same subject configuration as the previously detected configuration is detected, and in steps S504 through S505, image-recording is executed again with a certain composition.

Then, if a positive determination result is obtained in step S507, image-recording has been performed with the same subject configuration the prescribed number of times. Then, in this case, the process proceeds to step S508 in which imaging field-of-view range changing control is executed. In step S511, the count value cnt is initialized, and the process then returns to step S501.

Concerning this imaging field-of-view range changing control, the second or third embodiment shown in FIG. 11 or 12, respectively, may be applied. If the third embodiment is applied, it is determined in step S503 whether a new subject has been detected, in a manner similar to step S403 of FIG. 12.

In the fourth embodiment, when the captured image data represented by an image with the same subject configuration is recorded the number of times corresponding to the prescribed maximum value N, another subject configuration is searched for. That is, care is taken not to record images with the same subject configuration more than necessary.

8. Example of Automatic Image-Recording Algorithm According to Transition Conditions (Fifth Embodiment)

Figure 16:
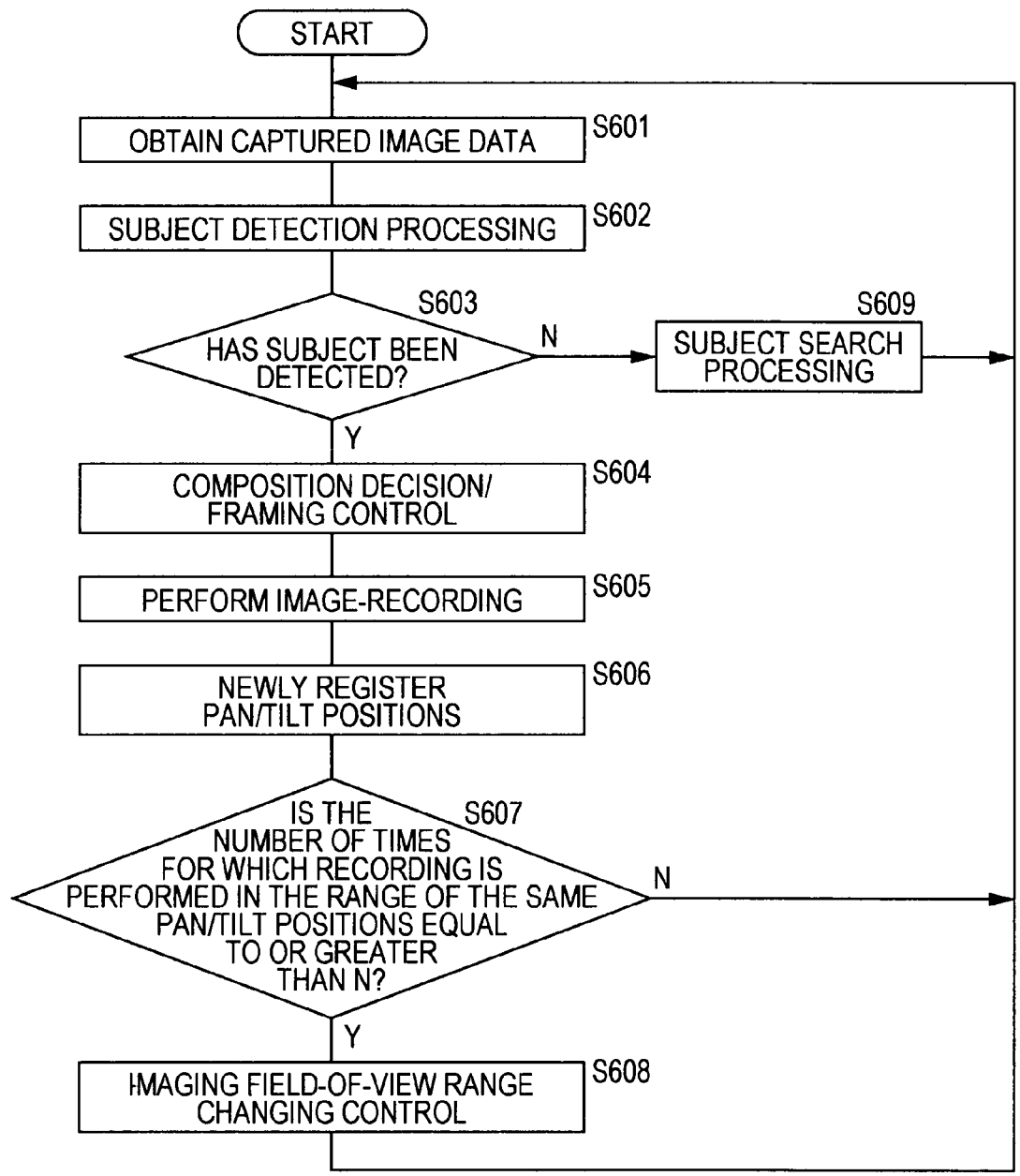
FIG. 16 is a flowchart illustrating an example of an algorithm for composition control, as a fifth embodiment.

The flowchart of FIG. 16 illustrates an example of the composition control algorithm as a fifth embodiment. The fifth embodiment employs composition control according to a specific example of transition conditions which are different from those of the fourth embodiment.

In FIG. 16, steps S601 through S605, S608, and S609 correspond to steps S101 through S105, S208, and S209, respectively, in FIG. 10.

In the fifth embodiment, recording pan/tilt position information is stored as the imaging-recording history information. Although it is not shown, this recording pan/tilt position information is information in which every time image-recording is performed, the pan/tilt positions when the image-recording is performed are stored. The pan direction may concern more significantly the subject configuration rather than the tilt direction. Accordingly, instead of the recording pan/tilt position information, information registering only the pan position when image-recording has been performed may be used.

In step S606 of FIG. 16, the pan/tilt positions when image-recording has been performed in step S605 are newly registered in the recording pan/tilt position information. This step S606 corresponds to the updating of image-recording history information in step S206 of FIG. 10.

Then, by referring to the recording pan/tilt position information, the composition decision block 62 determines the number of pan/tilt positions (number of pan/tilt positions for decision) that are within the same range of the pan/tilt positions which have been newly registered in the previous step S606. This number of pan/tilt positions for decision indicates the number of times for which image-recording has been performed at almost the same pan/tilt positions. For example, on the precondition that the positions of subjects around the imaging system are not changed very much, the number of times for which image-recording has been performed at almost the same pan/tilt positions indicates, i.e., the number of times for which image-recording has been performed with the same subject configuration.

Then, the composition decision block 62 determines in step S607 whether this number of pan/tilt positions for decision, i.e., the number of times for which recording has been performed in the range of the pan/tilt positions at which image-recording has been performed this time, is equal to or greater than the prescribed maximum number N.

If a negative determination result is obtained in step S607, the process returns to step S601. Accordingly, normally, for example, in step S603, the same subject configuration as that of the previous time is detected, and in step S605, image-recording is performed in the range of the pan/tilt positions which are considered to be the same as those of the previous time.

Then, at a certain time of the process in which such processing is repeated, a positive determination result is obtained in step S607, and the process then proceeds to step S608.

9. Example of Automatic Image-Recording Algorithm According to Transition Conditions (Sixth Embodiment)

As the subject detection processing, concerning detected individual subjects, the composition decision block 62 of the present embodiment also performs individual recognition processing for differentiating the individuals. Accordingly, detection information concerning each subject also includes individual recognition information indicating the individual recognition processing result for each detected individual subject.

It is noted that the algorithm for the individual recognition processing is also similar to that for a face detection system and technique and is not particularly restricted in the present embodiment.

Also, in the sixth embodiment, individual information concerning each subject obtained by the individual recognition processing is utilized as the transition conditions.

Figure 17:
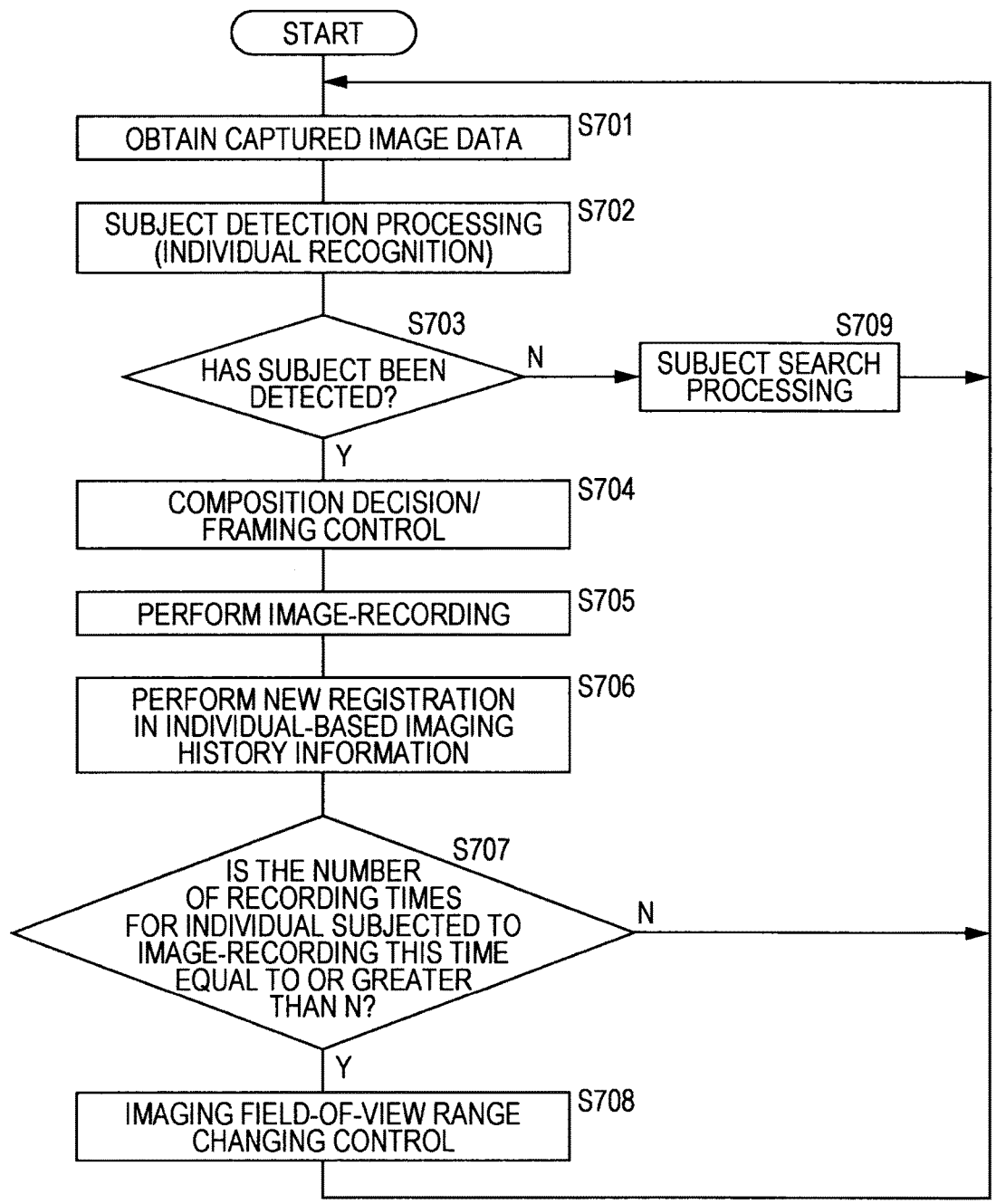
FIG. 17 is a flowchart illustrating an example of an algorithm for composition control, as a sixth embodiment.

The flowchart of FIG. 17 illustrates an example of the composition control algorithm as a sixth embodiment. In this diagram, steps S701 through S705, S708, and S709 correspond to steps S101 through S105, S108, and S109, respectively, in FIG. 10.

First, in subject detection processing in step S702 of FIG. 17, as described above, the detection result includes information (individual recognition information) for differentiating and recognizing individuals concerning each detected subject as a result of performing individual recognition processing based on face recognition.

The image-recording history information in this case is individual-based imaging history information. Although it is not shown, the individual-based imaging history information has a structure in which the number of times for which image-recording has been performed is associated with each individual recognition information concerning a subject which has been subjected to image-recording.

On that basis, in step S706, as the updating processing for the image-recording history information, the composition decision block 62 updates the individual-based imaging history information on the basis of the individual recognition information concerning a subject detected in the image which has been image-recorded in step S705. For example, if the individual recognition information concerning the subject which has been image-recorded in step S705 has not yet been registered in the individual-based imaging history information, it is newly registered, and then, the number indicating that the number of image-recording times is 1 is stored in association with the individual-based imaging history information. In contrast, if the individual recognition information concerning the subject which has been image-recorded in step S705 has already been registered in the individual-based imaging history information, the number of image-recording times associated with this individual-based imaging history information is updated by incrementing the number.

Then, by referring to the current individual-based imaging history information, the composition decision block 62 determines in step S707 whether the number of times for which image-recoding has been performed so far for the subject as an individual subjected to image-recording this time is equal to or greater than the prescribed maximum value N. That is, in this case, it is determined whether the transition conditions are satisfied by determining whether or not the individual as a subject has been recorded a predetermined number of times which corresponds to the prescribed maximum number N or greater.

It is noted that, in the processing of step S707, if a plurality of subjects have been subjected to image-recording this time, a determination result may be made positive when the numbers of image-recording times for all the subjects (individuals) are equal to or greater than the prescribed maximum number N. Alternatively, a determination result may be made positive when the numbers of image-recording times of a certain number of a plurality of subjects (individuals) or a certain proportion of the numbers of image-recording times of a plurality of subjects is equal to or greater than the prescribed maximum number N.

If a negative determination result is obtained in step S707, the process returns to step S701 in which image-recording is performed, for example, with the same subject configuration. Then, at a certain time of the process in which such processing is repeated, a positive determination result is obtained in step S707, and the process then proceeds to step S708 in which the pan/tilt/zoom control block 63 performs imaging field-of-view range changing control.

Also, in this configuration, with an application of the imaging field-of-view range changing control according to the third embodiment shown in FIG. 12, if the process proceeds to step S701 after executing step S708 and reaches step S703, an algorithm for determining whether an individual subject which has not been detected in the previous image-recording is newly detected may be employed.

10. Example of Changing of Prescribed Maximum Value According to Imaging Frequency (Seventh Embodiment)

In the automatic image-recording performed by the imaging system of the present embodiment, a suitable imaging frequency may be different in accordance with various situations when image-recording is performed. For example, if the number of subjects around the imaging system is small, the imaging frequency may be lower. In contrast, if the number of surrounding subjects is large, it is preferable that the imaging frequency be high in order to image-recording those subjects evenly within a certain limited time. Additionally, for example, both the digital still camera 1 and the pan/tilt head 10 of the present embodiment can be battery-driven. If it is desired that the driving time of batteries be as long as possible, it is more advantageous if the total time for which pan/tilt/zoom are switched in the unit time or the number of image-recording times be smaller.

In view of this background, the imaging system of the present embodiment is able to perform an operation for changing and setting the automatic image-recording frequency through a user operation.

For example, this operation may be carried out by performing an operation on the digital still camera 1. For example, a user performs an operation on a menu screen, etc., displayed on the display screen unit 33a so as to call a screen (recording-frequency setting screen) for changing and setting the automatic image-recording frequency (recording frequency). Then, by performing the operation on this recording-frequency setting screen, the user is able to select and set the level which is presented as the recording frequency. The levels of the recording frequency that the user is able to select and set are not particularly restricted. For example, a range of numerical values, such as from 0 (lowest) to 10 (highest), may be set, and the user may select one level from this numerical-value range. Alternatively, in contrast, as a simpler version of this, three levels or so, i.e., high, intermediate, low, may be employed.

Here, the threshold, which serves as the prescribed maximum value N used as a determination regarding whether the transition conditions are satisfied, in the flowcharts of FIGS. 15 through 17 corresponding to the foregoing fourth through sixth embodiments, respectively, can be considered, as the common concept, as the maximum value of the number of image-recording times that is allowed for one subject configuration.

Basically, as this prescribed maximum value N, a suitable fixed value may be prescribed in advance. However, even though this prescribed maximum value N relates to the recording frequency, if the recording frequency is variable and if the prescribed maximum value N is fixed, the following inconvenience, for example, may arise.

For example, if the fixed value as the prescribed maximum value N is relatively small even when the recording frequency is set to be high, the number of photos to be image-recorded with one subject configuration is small, and as a result, the frequency may not be increased.

Accordingly, in the seventh embodiment, the prescribed maximum value N is also changed and set in accordance with the setting of the recording frequency.

Figure 18:
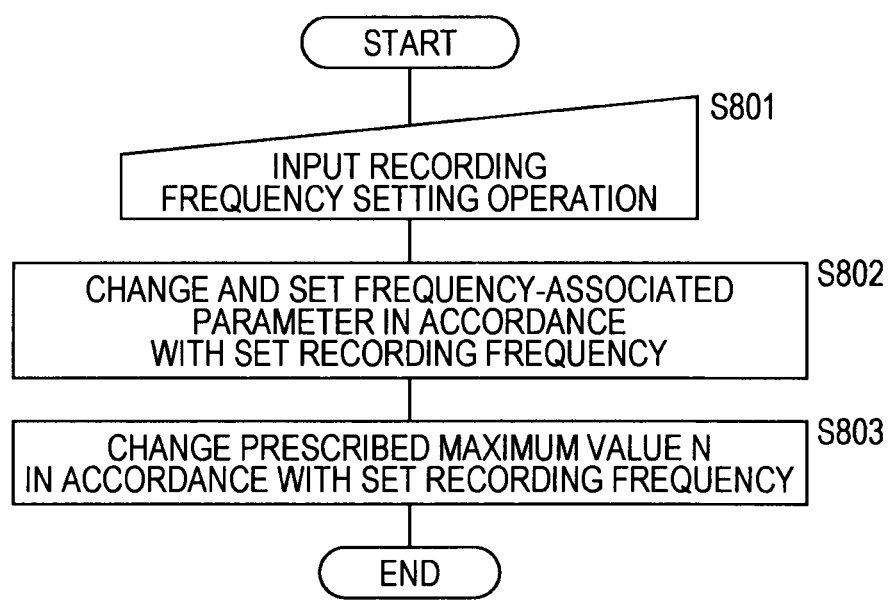
FIG. 18 is a flowchart illustrating an example of an algorithm for composition control, as a seventh embodiment.

The flowchart of FIG. 18 illustrates an example of the algorithm as this seventh embodiment. This processing may be performed by, for example, the composition decision block 62.

In FIG. 18, first, in step S801, the composition decision block 62 inputs an operation for changing the recording frequency performed on the recording frequency setting screen by a user. Then, in step S802, a predetermined parameter prepared for changing and setting the actual recording frequency is changed and set so that the frequency with the automatic image-recording obtained as the actual operation is performed reflects the recording frequency set in step S801.

As this parameter for setting the recording frequency, several parameters may be considered.

In the actual operation in S504 and S505 of FIG. 15, if it is determined that a decided composition has been obtained while performing framing control, image-recording is performed. One of the parameters for setting the recording frequency may be changing of a margin used for determining whether a decided composition has been obtained with respect to the subject position, the subject size, etc., which are elements forming the decided composition.

For example, in step S802, as the set recording frequency is higher, the composition decision block 62 sets a larger margin for the target values of the above-described subject position and subject size. Thus, even if the subject position, the subject size, etc., somewhat considerably deviate from the original target values, it is determined that a decided composition has been obtained, and image-recording is performed. That is, the actual recording frequency is increased.

In the determination in S504 and S505 of FIG. 15 regarding whether a decided composition has been obtained, it is also determined whether the decided composition has been obtained for a predetermined time or longer, and if a certain time or longer has elapsed, image-recording is performed. This determination is to determine how stably the decided composition has been obtained.

This predetermined time for determining the stability of a decided composition can also be a parameter for setting the recording frequency.

In this case, in step S802, as the set recording frequency is higher, the composition decision block 62 sets the above-described predetermined time for determining the stability to be shorter. Thus, even if a composition is somewhat unstable, it is determined that the composition is a decided composition, and image-recording is performed. Accordingly, the actual recording frequency is increased.

Also, in FIG. 15, if it is determined in step S502 that a subject has not been detected, the process proceeds to the subject search processing in step S510 after resetting the count value cnt in step S509. In this case, instead of immediately starting the subject detection processing, the subject detection processing may be started after a certain wait time. Then, this wait time may be considered as a parameter for setting the recording frequency.

More specifically in step S802, as the recording frequency set through a user operation is higher, the composition decision block 62 executes processing for setting the above-described wait time to be progressively shorter. It is noted that the wait time may be set to be 0 in accordance with the highest recording frequency. This changes the recording frequency of the actual automatic image-recording operation.

Also, if the sequence shown in FIG. 15 is executed as it is, the process immediately returns from step S507 to step S501. Accordingly, image-recording for the number of times corresponding to the prescribed maximum value N with the same subject configuration is performed in a short cycle. Thus, a wait time after image-recording is performed one time may be set before subsequent image-recording is performed, and this may be a parameter for setting the recording frequency.

In this case, too, in step S802, as the recording frequency set through a user operation is higher, the composition decision block 82 sets the above-described wait time to be progressively shorter. In this case, too, the wait time may be set to be 0 in accordance with the highest recording frequency.

In association with FIG. 15, an algorithm may be formed such that the counting of this wait time is executed when the process returns to step S501 since a negative determination result has been obtained in step S507.

Also, as the subject detection processing executed by the composition decision block 62, for example, the detection of a smiling face is performed. Further, the condition that a subject is smiling is set as a necessary condition for a decided composition. In this case, at a step in step S204 in which framing has been completed with respect to the subject size, the subject position, etc., it is further determined whether the subject is smiling. When a smiling face is obtained, image-recording is performed in step S205.

In this case, the threshold for a smiling level that can match a decided composition is set as a parameter for setting the recording frequency. Then, in step S802, as the recording frequency set through, for example, a user operation is higher, the above-described threshold is set to be lower. As the threshold for a smiling level is lower, image-recording is more likely to be performed with only a small smiling level. As a result, the actual image-recording frequency is increased.

Then, in step S803, the prescribed maximum value N is changed in accordance with the recording frequency set through the user operation. If, for example, it is desired that the above-described inconvenience be eliminated, the prescribed maximum value N may be changed as the set recording frequency is higher.

It is noted that, although in the above description the changing of the prescribed maximum value according to the imaging frequency is applied to the algorithm shown in FIG. 15 as the fourth embodiment, it may be similarly applied to the algorithm shown in FIG. 16 or 17 according to the fifth or sixth embodiment, respectively. This point also applies to an eighth embodiment, which will be described below.

11. Example of Changing of Prescribed Maximum Value According to the Number of Subjects (Eighth Embodiment)

Incidentally, as the number of subjects forming one subject configuration is larger, the image content created by those subjects may become more diverse. From this point of view, it can be said that, as the number of subjects detected by the subject detection processing is larger, the number of image-recording times may be increased even with the same subject configuration.

From this point of view, as the algorithm, the following configuration may be preferable. The prescribed maximum value N is changed in accordance with the number of subjects, for example, the prescribed maximum value N is increased in accordance with the number of subjects detected by the subject detection processing is larger.

The eighth embodiment employs an algorithm for changing and setting the prescribed maximum value N in accordance with the number of detected subjects.

Figure 19:
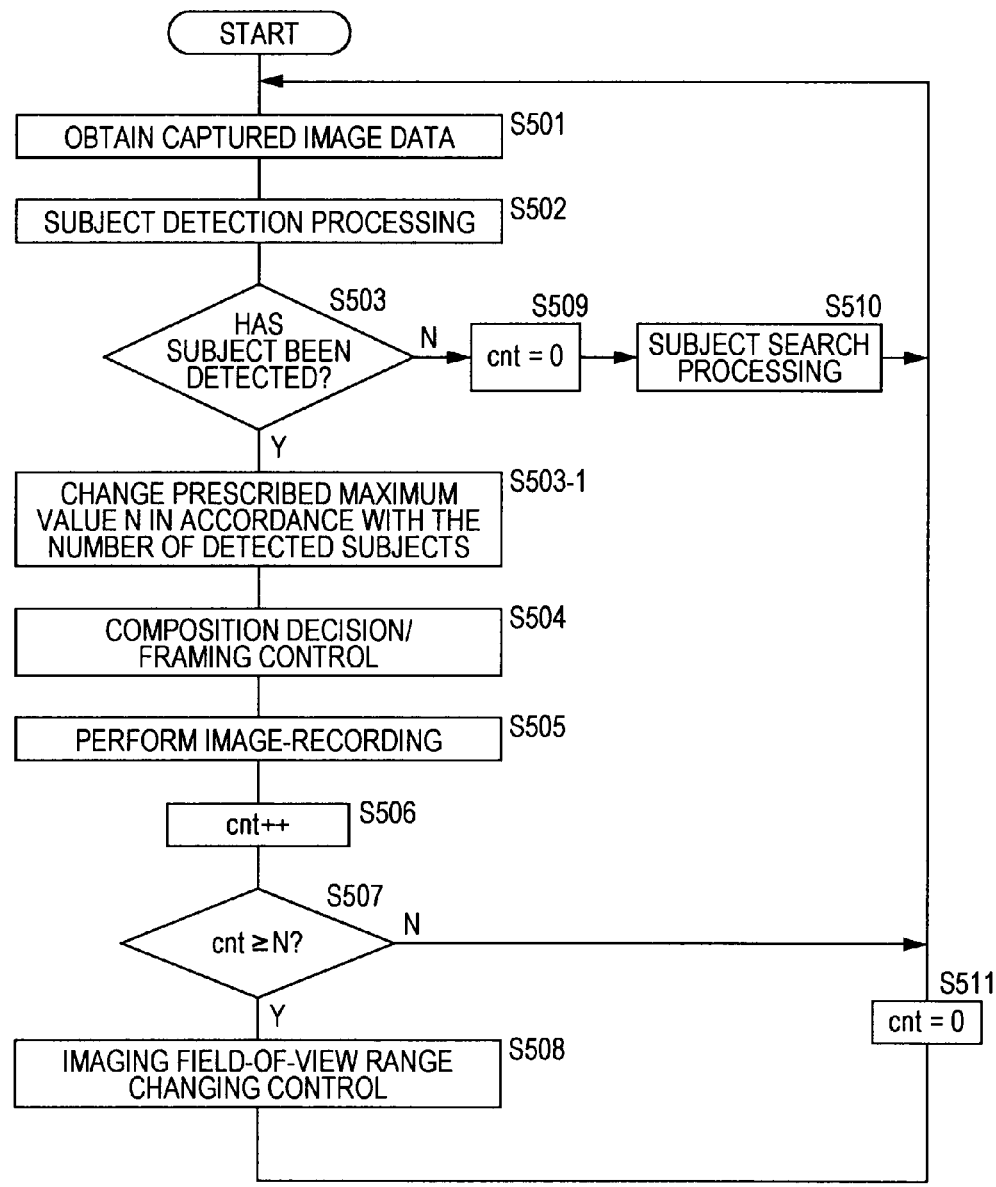
FIG. 19 is a flowchart illustrating an example of an algorithm for composition control, as an eighth embodiment.

The flowchart of FIG. 19 illustrates an example of a composition control algorithm including the configuration of the eighth embodiment.

The processing shown in FIG. 19 is based on the flowchart of FIG. 10 corresponding to the second embodiment to which the eighth embodiment is applied. In this diagram, the same steps shown in FIG. 10 are designated by like step numbers.

In FIG. 19, processing as step S503-1 is added subsequent to step S503.

In step S503-1, the prescribed maximum value N is changed in accordance with the number of subjects which have been detected in the subject detection processing in steps S502 and S503. This changing may be made by using a preset arithmetic expression, for example, to find a larger prescribed maximum value N as the number of detected subjects is larger, as described above.

In step S507, determination processing is executed by using the prescribed maximum value N found in the above-described step S503-1.

12. Modified Examples

First Modified Example

An optimum composition that can be considered in association with one subject configuration is not necessarily only one, and, in reality, several variations can be considered. For example, in the description of the fourth embodiment, it is possible to perform image-recording for one subject configuration for the prescribed maximum value N. In this case, if a different composition is obtained every time image-recording is performed toward the prescribed maximum value N, the content of photos obtained in association with one subject configuration is varied, which is more preferable.

In a first modified example, therefore, as described above, a configuration for enabling a different composition to be obtained every time image-recording is performed toward the prescribed maximum value N is proposed.

Figure 20:
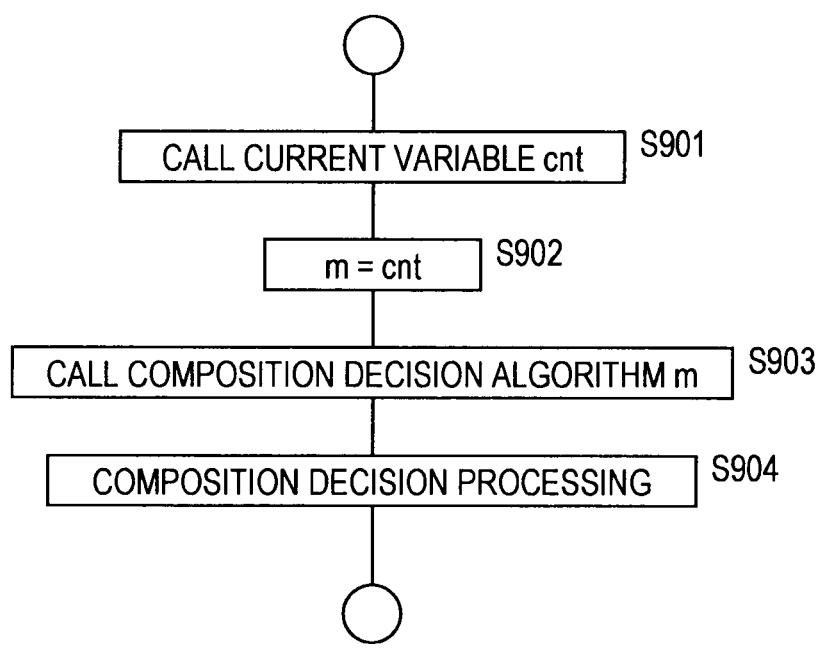
FIG. 20 is a flowchart illustrating an example of an algorithm for composition control, as a first modified example.

FIG. 20 illustrates an example of steps according to the first modified example.

This processing is, for example, processing for selecting a composition decision algorithm when performing composition decision processing in step S504 of FIG. 15.

First, it is now assumed that the composition decision block 62 stores therein different composition decision algorithms in accordance with the numbers of the prescribed maximum number N that can be set.

On that basis, in FIG. 20, in step S901, the composition decision block 62 first calls the current count value cnt. Then, in step S902, the composition decision block 62 substitutes the value set as this called count value cnt into variable m.

The variable m corresponds to the identification number of the composition decision algorithm stored in the composition decision block 62. In step S903, the composition decision block 62 calls the composition decision algorithm $m(1<m<N)$ among the composition decision algorithms 1 through N. Then, in step S904, the composition decision block 62 executes the program as the composition decision algorithm m so as to execute the composition decision processing for the currently detected subject.

With this processing, the composition decision algorithm is changed in accordance with the count value cnt. That is, a different composition is obtained every time image-recording is performed with one subject configuration.

It is noted that, for example, if the absolute positions of subjects are stored, the time when a cycle of operations for imaging all the subjects by the view-of-field range changing control has been completed can be identified. Also, in the case of the sixth embodiment, on the basis of the individual recognition information, the time when a cycle of operations for imaging all the surrounding subjects by the view-of-field range changing control has been completed can be identified. In this case, if the automatic image-recording operation of the imaging system is continuously ON, the imaging system performs a second cycle of automatic image-recording.

Then, as an application of the first modified example, the composition decision algorithm may be changed, as described above, every time one cycle of automatic image-recording has been completed.

Second Modified Example

Also, as in the above-described first modified example, when image-recording is performed with one subject configuration and with different compositions for the number of times corresponding to the prescribed maximum value N, the following situations, in reality, can be assumed.

More specifically, for example, it is now assumed that the composition decision algorithm selected in step S504 indicates that a composition obtained by changing the positional relationship among a plurality of subjects in a frame is suitable. In this case, if detected persons as the subjects move very little, the positional relationship among those subjects is not changed, thereby failing to obtain a decided composition. Additionally, as the composition decision algorithm, the condition that a subject is smiling may be an element of the optimum composition, or the condition that the direction of the face of a subject is different from that of the previous time may be an element of the optimum composition. In this case, if a person as the subject would not smile or if a person as the subject faces in the same direction as that of the previous image-recording, the decided composition is not obtained.

If there is no change in the subjects in this manner, photos having only similar image contents are obtained even if image-recording is performed the number of times corresponding to the prescribed maximum value N. Then, in this case, it can be said that it is better to shift to another subject configuration without performing image-recording the number of times corresponding to the prescribed maximum value N.

Accordingly, in the second modified example, an algorithm is formed such that when a decided composition is not obtained, as described above, the subject configuration is shifted to another subject configuration.

Figure 21:
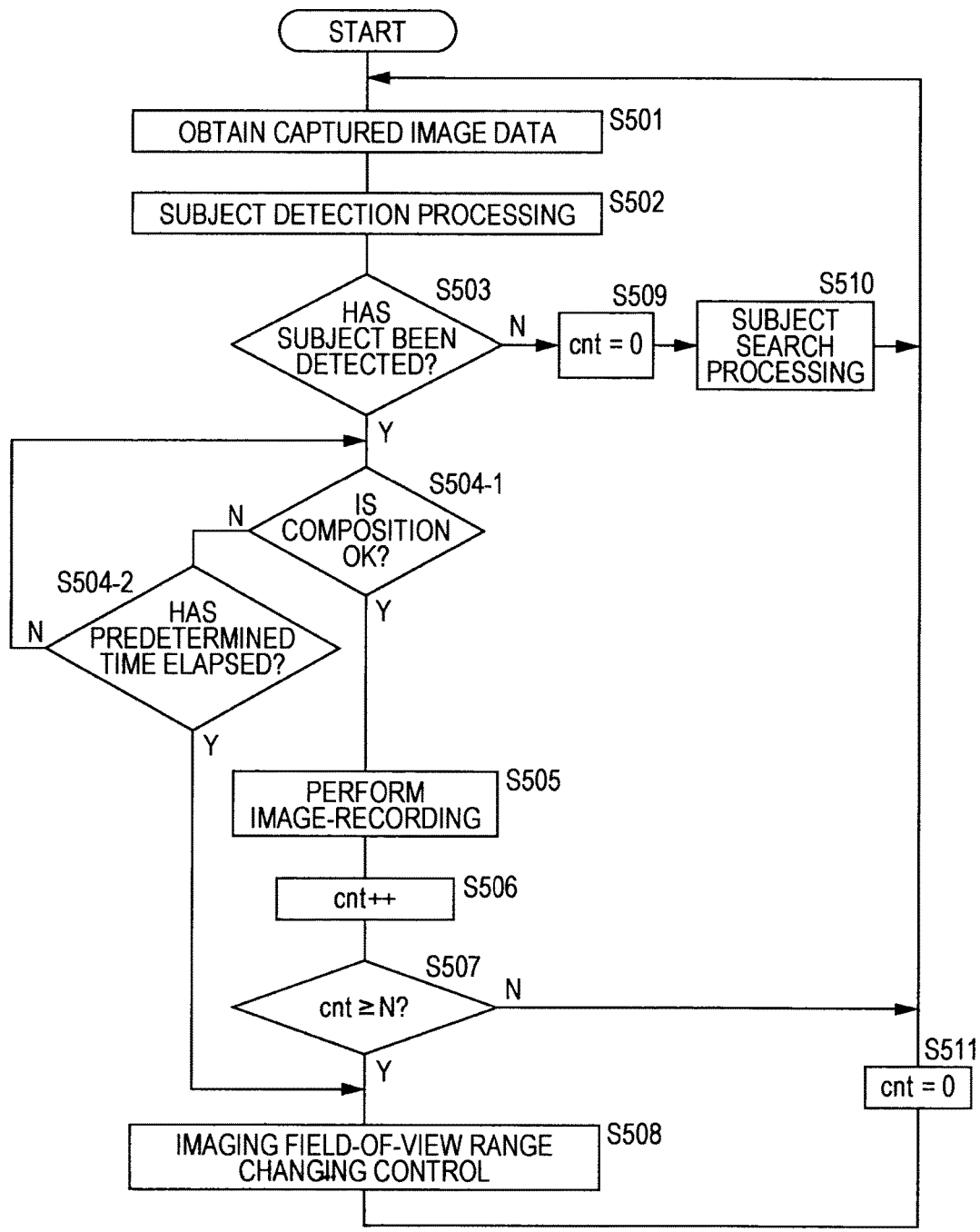
FIG. 21 is a flowchart illustrating an example of an algorithm for composition control, as a second modified example.

The flowchart of FIG. 21 illustrates an example of the composition control algorithm according to the second modified example. The processing shown in this diagram is an example in which the second modified example is applied to the algorithm according to the fourth embodiment shown in FIG. 15, and the same steps as shown in FIG. 15 are designated by like step numbers.

In FIG. 21, steps S504-1 and S504-2 are added.

In step S504, the composition decision block 62 executes composition decision processing by using the composition decision algorithm m and framing control for, for example, the subject position and the subject size, which correspond to the first modified example. The composition decision block 62 then determines in step S504-1 whether a decided composition has been obtained (OK). Here, as in the above-described example, if a decided composition is not obtained since there is no change in the positions or the faces of the subjects, composition control in step S504 and a determination regarding whether the composition is OK in step S504-1 are executed until it is determined in step S504-2 that a predetermined time has elapsed.

Here, if it is determined in step S504-1 that the composition is OK before the above-described predetermined time has elapsed, the process proceeds to step S505 and the subsequent steps to perform image-recording.

In contrast, if it is determined in step S504-2 that the predetermined time has elapsed without obtaining a determination result that the composition is OK in step S504-1, the process proceeds to step S508 in which imaging field-of-view range changing control by using the pan/tilt/zoom control block 63 is performed.

Although it is substantially only temporal, the sequence for shifting to step S508 since it is determined in step S504-2 that the predetermined time has elapsed can be considered as the processing for obtaining a positive determination result in step S507 in which the prescribed maximum value N is made equal to the current count value cnt since there is no change in the composition.

It is noted that the second modified example has been described on the precondition that a decided composition is changed in accordance with the count value cnt. However, the second modified example is also applicable to an algorithm in which a decided composition is not changed. In this case, if a composition decided in accordance with one subject configuration has not been obtained for a predetermined time, the process proceeds to imaging field-of-view range changing control in step S508 without performing image-recording even one time.

Also, with respect to combinations of the first through eighth embodiments and the first and second modified examples, combinations thereof other than the above-described combinations are possible.

13. Modified Examples of Imaging System of Present Embodiment

Figure 22:
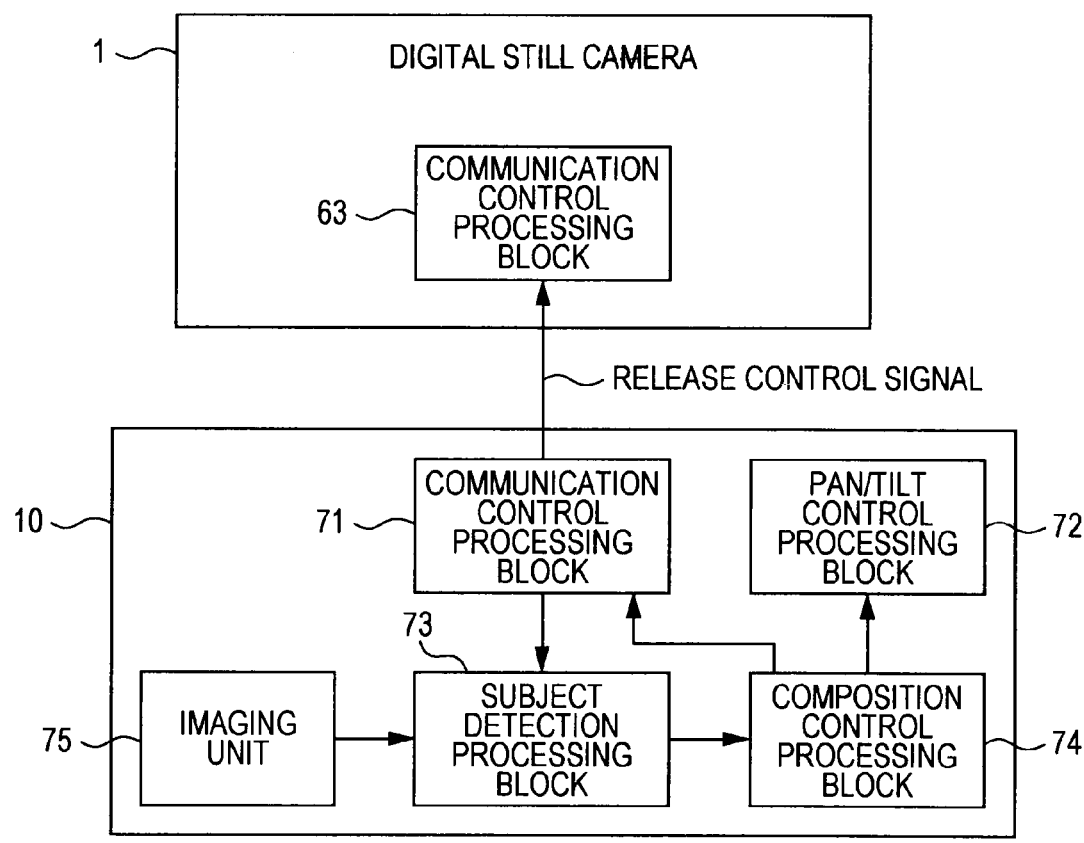
FIG. 22 is a diagram illustrating an example of the configuration as a modified example made to the imaging system of the embodiment.

FIG. 22 illustrates an example of the configuration, as a modified example made to the imaging system of the present embodiment shown in FIGS. 7 and 8.

In this diagram, first, captured image data generated in the signal processing unit 24 based on imaging is sent from the digital still camera 1 to the pan/tilt head 10 via the communication control processing block 63.

In this diagram, as the configuration of the pan/tilt head 10, the communication control processing block 71, the pan/tilt control processing block 72, a subject detection processing block 73, and a composition control processing block 74 are shown.

The communication control processing block 71 is a functional section corresponding to the communication unit 52 shown in FIG. 7, and is a section that is configured to perform communication processing with the communication control processing block 63 (pan/tilt-head-compatible communication unit 34) of the digital still camera 1 in accordance with predetermined protocols.

The captured image data received by the communication control processing block 71 is delivered to the subject detection processing block 73. This subject detection block 73 is configured to include a signal processing unit that is able to perform at least subject detection processing comparable to the composition decision block 62 shown in FIG. 8, and performs subject detection processing on the input captured image data so as to output the detection information to the composition control processing block 74.

The composition control processing block 74 is able to perform composition control which is comparable to the composition control processing block 62 shown in FIG. 8. When performing pan control and tilt control as a result of this composition control processing, the composition control processing block 74 outputs a control signal for pan control and tilt control to the pan/tilt control processing block 72.

Among the control processing operations executed by the control unit 51 shown in FIG. 7, the pan/tilt control processing block 72 serves as an execution function of performing processing concerning pan/tilt control, and outputs a signal for controlling the movements of the pan mechanism unit 53 and the tilt mechanism unit 56 in accordance with the input control signal to the pan drive unit 55 and the tilt drive unit 58, respectively. With this operation, panning and tilting is performed so that the composition decided by the composition control processing block 62 can be obtained.

In this manner, the imaging system shown in FIG. 22 is configured to send captured image data from the digital still camera 1 to the pan/tilt head 10 so as to perform subject detection processing and composition control in the pan/tilt head 10 on the basis of the input captured image data.

If the zoom control is adapted to be performed, for example, the composition control block 74 is configured to instruct the digital still camera 1 to perform zoom control via the communication control processing block 71.

Figure 23:
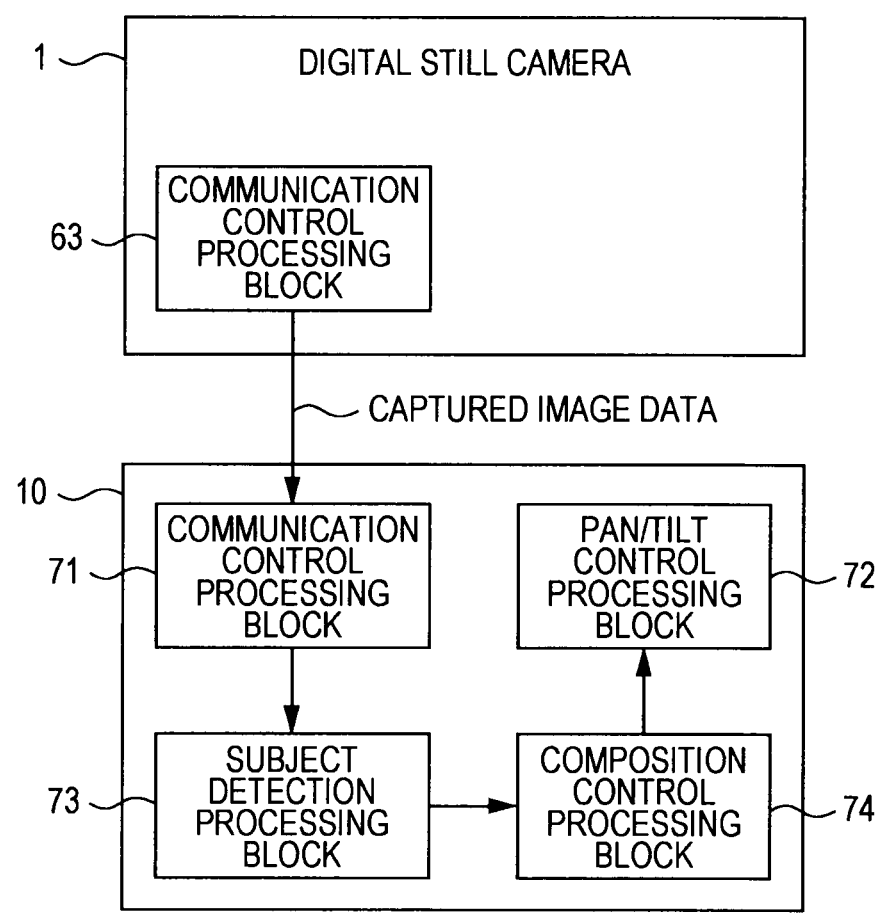
FIG. 23 is a diagram illustrating an example of the configuration as another modified example made to the imaging system of the embodiment.

FIG. 23 illustrates an example of the configuration, as another modified example made to the imaging system of the present embodiment. In this diagram, the same elements as shown in FIG. 22 are designated by like reference numerals, and an explanation thereof is thus omitted.

In this system, an imaging unit 75 is provided for the pan/tilt head 10. This imaging unit 75 includes, for example, an imaging optical system and an imaging device (imager) and obtains a signal (imaging signal) based on imaging light. The imaging unit 75 also includes a signal processing unit for generating captured image data from this imaging signal. This configuration corresponds to, for example, a section including a signal processing step of obtaining captured image data in the optical system unit 21, the image sensor 22, the A/D converter 23, and the signal processing unit 24 shown in FIG. 6. The captured image data generated in the imaging unit 75 is output to the subject detection processing block 73. It is noted that the direction in which imaging-capturing light is input into the imaging unit 75 (imaging direction) is set to be as close as possible to the imaging direction of the optical system unit 21 (lens unit 3) of the digital still camera 1 placed on the pan/tilt head 10.

In this case, the subject detection processing block 73 and the composition control processing block 74 perform subject detection processing and composition control processing, respectively, as in FIG. 22. In this case, however, in addition to pan/tilt control, the composition control processing block 74 causes the communication control processing block 71 to send a release instruction signal to the digital still camera 1 in accordance with a time at which a release operation is to be performed. Upon receiving the release instruction signal, the digital still camera 1 performs a release operation.

In this manner, in this modified example, concerning subject detection processing and composition control, all the control/processing operations, except for the release operation itself, can be completed in the pan/tilt head 10.

Pan control and tilt control executed in composition control as the present embodiment described above are performed by controlling the movements of the pan/tilt mechanisms of the pan/tilt head 10. However, instead of the pan/tilt head 10, for example, the following configuration may be employed. Imaging light reflected by a reflector is incident on the lens unit 3 of the digital still camera 1. On that basis, the reflected light is moved so that a panning and tilting result is obtained in an image obtained on the basis of the imaging light.

Alternatively, control may be performed so that a pixel region for receiving an imaging signal which is effective as an image from the image sensor 22 of the digital still camera 1 is shifted in the horizontal direction and in the vertical direction, thereby obtaining a result comparable to panning/tilting. In this case, it is not necessary to provide the pan/tilt head 10, or a panning/tilting device, which is equivalent to the pan/tilt head 10, other than the digital still camera 1, and by simply using the digital still camera 1, composition control as the present embodiment can be completed.

Alternatively, a mechanism for changing the optical axis of a lens in the optical system unit 21 in the horizontal and vertical directions may be provided, and by controlling the movement of this mechanism, panning/tilting can be performed.

Also, in the foregoing embodiments, the imaging system of the present embodiment is formed of the digital still camera 1 and the pan/tilt head 10, which are separate devices. However, for example, the imaging system may be configured as an imaging apparatus formed by integrating an imaging unit corresponding to the digital still camera 1 and a movable mechanism unit corresponding to the pan/tilt head 10.

Also, in the foregoing embodiments, it is assumed that the subjects (individual subjects) are persons, however, the invention of the present application may be applied to a case where animals other than persons are subjects.

Also, image data, which is an object of subject detection, is not restricted only to data obtained by imaging (captured image data). For example, image data representing the image content, such as paintings or design pictures, may be considered.

Also, the composition (optimum composition) decided in accordance with the invention of the present application is not necessarily restricted to a composition decided by adding an element, i.e., the number of detected individual subjects, to a composition setting technique, such as the rule of thirds. For example, even for a composition, which is generally considered to be not good, the user may find it interesting or even good depending on the setting of the composition. Accordingly, the composition (optimum composition) decided in accordance with the invention of the present application may be set as desired in consideration of practicability or entertainment characteristics. In reality, the decided composition is not particularly restricted.

Also, as described above, at least part of the configuration in accordance with the invention of the present application may be implemented by causing a CPU or a DSP to execute a program.

Such a program may be written and stored in, for example, a ROM, at the time of manufacturing, or may be stored in a removable storage medium and then be installed (including updating) from this storage medium into a DSP-support non-volatile storage area or the flash memory 30. Alternatively, the program may be installed via a data interface, such as a USB or IEEE1394, under the control of another device, which serves as a host. Further, the program may be stored in a storage device of, for example, a server on the network. Then, a network function may be provided for the digital still camera 1 so that the digital still camera 1 is configured to download and obtain the program from the server.

REFERENCE SIGNS LIST

1 digital still camera, 2 shutter button, 3 lens unit, 10 pan/tilt head, 21 optical system, 22 image sensor, 23 A/D converter, 24 signal processing unit, 25 encoding/decoding unit, 26 media controller, 27 control unit, 28 ROM, 29 RAM, 30 flash memory, 31 operation unit, 32 display driver, 33 display unit, 34 pan/tilt-head-compatible communication unit, 40 memory card, 51 control unit, 52 communication unit, 53 pan mechanism unit, 54 pan motor, 55 pan drive unit, 56 tilt mechanism unit, 57 tilt motor, 58 tilt drive unit, 61 image-recording block, 62 composition decision block, 63 pan/tilt/zoom control block, 64 communication control processing block, SBJ (SBJ0-*n*) subject, 71 communication control processing block, 72 pan/tilt control processing block, 73 subject detection processing block, composition control processing block, 75 imaging unit

The invention claimed is:

1. A control apparatus, comprising:
 circuitry configured to:
  receive image data which is obtained based on image captured by an imager;
  detect one or more subjects present in an image based on the image data;
  control execution of image-recording to record the image data which represents the image that contains the detected one or more subjects on a recording medium; and
  control a movable mechanism that changes an imaging field-of-view range of the imager to be driven based on a history of the image-recording of the image data which represents the image that contains the detected one or more subjects by movement of an imaging optical axis of the imager such that a subject that corresponds to a subject configuration which is at least different from a subject configuration used in last image-recording is to be detected,
  wherein the circuitry is further configured to control the movable mechanism such that the movable mechanism moves in a determined direction by a determined angle, and a value of the determined angle is greater than an angle of view of the imager.

2. The control apparatus according to claim 1, wherein the circuitry is further configured to control, based on detection result, the movable mechanism such that the movable mechanism moves along the determined direction until a subject, which is undetected in the last image-recording, is newly detected.

3. The control apparatus according to claim 1, wherein the circuitry is further configured to store, as the history, number-of-recording-times information that indicates the number of times for which an identical subject configuration is recorded, and control the movable mechanism to change the imaging field-of-view range of the imager based on the number of times indicated by the number-of-recording-times information.

4. The control apparatus according to claim 3, wherein the circuitry is further configured to:
   control the movable mechanism to change the imaging field-of-view range of the imager, based on the determination that the number of times indicated by information related to the history is equal to or greater than a threshold; and
   change and set the threshold based on a set frequency.

5. The control apparatus according to claim 3, wherein the circuitry is further configured to control the movable mechanism to change the imaging field-of-view range of the imager based on the determination that the number of times indicated by information that relates to the history is equal to or greater than a threshold.

6. The control apparatus according to claim 1, wherein the circuitry is further configured to store, as the history, recording position information that indicates a position of the movable mechanism in an event the image data is recorded, and control the movable mechanism to change the imaging field-of-view range of the imager based on the recording position information, based on the number of image-recording times at a position which is considered to be a position identical to the position of the movable mechanism at which the last image-recording has been executed.

7. The control apparatus according to claim 1, wherein the circuitry is further configured to:
   recognize each of the detected one or more subjects so as to obtain individual identification information to differentiate and identify individuals; and
   store, as the history, number-of-individual-recording-times information that indicates the number of times for which each of the detected one or more subjects are recorded, and control the movable mechanism to change the imaging field-of-view range of the imager based on the number of times indicated by the number-of-individual-recording-times information.

8. The control apparatus according to claim 1, wherein the circuitry is further configured to:
   decide a composition based on the detected one or more subjects;
   at least one of the movable mechanism and zoom control for the imager to obtain a decided composition; and
   execute image-recording based on the determination that the decided composition has been obtained.

9. The control apparatus according to claim 8, wherein the circuitry is further configured to obtain, as a decision result of a current composition decision, a composition different from a composition used in the last image-recording based on a subject configuration which is identical to the subject configuration used in the current image-recording.

10. The control apparatus according to claim 8, wherein the circuitry is further configured to control the movable mechanism in an event the decided composition is unobtained within a determined time.

11. The control apparatus according to claim 1, wherein the circuitry is further configured to increase a frequency with which the image-recording is to be executed in an event a number of the detected one or more subjects is large.

12. An imaging system, comprising:
   a control apparatus; and
   a movable mechanism apparatus that includes a mechanism that is movable so as to change an imaging field-of-view range of the control apparatus,
   the control apparatus or the movable mechanism apparatus including that includes circuitry configured to:
      receive image data which is obtained based on image captured by an imager;
      detect one or more subjects present in an image based on the image data,
      control execution of image-recording to record the image data which represents the image that contains the detected one or more subjects on a recording medium of the control apparatus; and
      control the movable mechanism apparatus by movement of an imaging optical axis of the imager based on a history of the image-recording of the image data which represents the image that contains the detected one or more subjects such that a subject that corresponds to a subject configuration which is at least different from a subject configuration used in last image-recording is to be detected,
   wherein the circuitry is further configured to control the movable mechanism such that the movable mechanism moves in a determined direction by a determined angle, and a value of the determined angle is greater than an angle of view of the imager.

13. A control method, comprising:
   receiving image data which is obtained based on imaging by an imaging unit and detecting one or more subjects present in an image based on the image data;
   controlling execution of image-recording for recording the image data which represents the image containing the detected one or more subjects on a recording medium; and
   controlling driving of a movable mechanism unit that changes an imaging field-of-view range of the imaging unit based on a history of the image-recording of the image data which represents the image containing the detected one or more subjects by moving an imaging optical axis of the imaging unit such that a subject that corresponds a subject configuration which is at least different from a subject configuration used in last image-recording is to be detected,
   wherein the movable mechanism unit is controlled such that the movable mechanism unit moves in a determined direction by a determined angle, and a value of the determined angle is greater than an angle of view of the imaging unit.

14. A non-transitory computer-readable medium storing a program for causing a control apparatus to perform operations, comprising:
   receiving image data which is obtained based on imaging by an imaging unit and detecting one or more subjects present in an image based on the image data;
   controlling execution of image-recording for the image data which represents the image containing the detected one or more subjects on a recording medium; and controlling driving of a movable mechanism that changes an imaging field-of-view range of the imaging based on a history of the image-recording of the image data which represents the image containing the detected one or more subjects by moving an imaging optical axis of the imaging unit such that a subject that corresponds to a subject configuration which is at least different from a subject configuration used in last image-recording is to be detected, wherein the movable mechanism is controlled such that the movable mechanism moves in a determined direction by a determined angle, and a value of the determined angle is greater than an angle of view of the imaging unit.

15. An image processing apparatus, comprising:
circuitry configured to:
  receive image data which is obtained based on image captured by an imager;
  detect one or more subjects present in an image based on the image data;
  control execution of image-recording to record the image data in which the detected one or more subjects is contained in a frame on a recording medium;
  change the frame based on a history of the image-recording of the image data which represents the image that contains the detected one or more subjects by movement of an imaging optical axis of the imager such that a subject that forms a subject configuration which is at least different from a subject configuration used in last image-recording is to be detected; and
  control a movable mechanism that changes an imaging field-of-view range of the imager,
wherein the circuitry is further configured to control the movable mechanism such that the movable mechanism moves in a determined direction by a determined angle, and a value of the determined angle is greater than an angle of view of the imager.

* * * * *